(12) United States Patent
Morikawa

(10) Patent No.: US 11,370,019 B2
(45) Date of Patent: Jun. 28, 2022

(54) BACKFLOW PREVENTION DEVICE OF LIGHT METAL INJECTION DEVICE AND BACKFLOW PREVENTION METHOD OF LIGHT METAL INJECTION DEVICE

(71) Applicant: Sodick Co., Ltd., Kanagawa (JP)

(72) Inventor: Tadashi Morikawa, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 17/330,394

(22) Filed: May 25, 2021

(65) Prior Publication Data

US 2021/0379649 A1    Dec. 9, 2021

(30) Foreign Application Priority Data

Jun. 9, 2020 (JP) .............................. JP2020-099771

(51) Int. Cl.
*B22D 17/20* (2006.01)
*B22D 17/32* (2006.01)
*F16K 1/36* (2006.01)
*F16K 31/54* (2006.01)

(52) U.S. Cl.
CPC ......... *B22D 17/2076* (2013.01); *B22D 17/32* (2013.01); *F16K 1/36* (2013.01); *F16K 31/54* (2013.01)

(58) Field of Classification Search
CPC .... B22D 17/20; B22D 17/2076; B22D 17/32; B22D 2/003; B22D 17/2015; B22D 17/2046; B22D 17/30; F16K 1/36; F16K 31/54

USPC ........................ 164/303, 312, 151.2, 154.2
See application file for complete search history.

(56) References Cited

U.S. PATENT DOCUMENTS

| 10,695,827 | B2 | 6/2020 | Fujikawa | |
| 2005/0056978 | A1* | 3/2005 | Fujikawa | B22D 17/28 |
| | | | | 266/200 |
| 2020/0108439 | A1 | 4/2020 | Fujikawa | |

FOREIGN PATENT DOCUMENTS

| JP | 2642713 | 8/1997 |
| JP | 2005161375 | 6/2005 |

\* cited by examiner

*Primary Examiner* — Kevin P Kerns
(74) *Attorney, Agent, or Firm* — JCIPRNET

(57) ABSTRACT

A backflow prevention device of a light metal injection device and a backflow prevention method thereof of the disclosure include: a valve which has a valve body made of a corrosion-resistant and heat-resistant steel and a valve seat made of a ceramic, and in which the valve body advances and is seated on the valve seat to close a communication path communicating a melting unit and an injection unit, and the valve body retracts and is separated from the valve seat to open the communication path; a valve body drive device which moves a drive body to which the valve body is connected forward and backward; a position sensor which detects that the drive body has reached at least a predetermined advance limit position; and a valve body drive control device which controls the valve body drive device based on a signal of the position sensor.

12 Claims, 18 Drawing Sheets

BACKFLOW PREVENTION DEVICE OF LIGHT METAL INJECTION DEVICE AND BACKFLOW PREVENTION METHOD OF LIGHT METAL INJECTION DEVICE

CROSS-REFERENCE TO RELATED APPLICATION

This application claims the priority benefit of Japan application serial no. 2020-099771, filed on Jun. 9, 2020. The entirety of the above-mentioned patent application is hereby incorporated by reference herein and made a part of this specification.

BACKGROUND

Technical Field

The disclosure relates to a backflow prevention device of a light metal injection device and a backflow prevention method of a light metal injection device, which connect a melting unit that melts an unmelted light metal material into a molten metal and an injection unit that injects the molten metal into a mold by a communication path, open the communication path when the molten metal in the melting unit is supplied to the injection unit, and close the communication path when the molten metal in the injection unit is injected to the mold.

Related Art

A light metal injection molding machine injects a molten metal of a light metal material into a mold, and cools and solidifies the molten metal in the mold to manufacture a molded product. The light metal injection molding machine includes a light metal injection device and a mold clamping device. The light metal injection device melts an unmelted light metal material into a molten metal, and then injects the molten metal into the mold. The mold clamping device opens and closes the mounted mold and tightens the closed mold. The light metal material generally refers to a metal having a specific gravity of 4 or less. Practically, aluminum and magnesium are particularly effective as the light metal material.

The light metal injection device includes a melting unit, an injection unit, a communication path connecting the melting unit and the injection unit, and a backflow prevention device which opens and closes the communication path. The melting unit melts the unmelted light metal material into the molten metal. The injection unit injects the molten metal supplied from the melting unit through the communication path into the mold. The communication path is a flow path through which the molten metal passes. The backflow prevention device opens the communication path when the molten metal in the melting unit is supplied to the injection unit, and closes the communication path in order to prevent the molten metal from flowing back into the melting unit when the molten metal in the injection unit is injected to the mold.

The backflow prevention device includes, for example, a valve configured by a valve body and a valve seat. The valve closes the communication path by advancing the valve body to be seated on the valve seat on one hand, and opens the communication path by retracting the valve body to be separated from the valve seat on the other hand.

An injection device of a light metal injection molding machine in Patent literature 1 (United States Patent Laid-Open No. 2020/0108439) includes the backflow prevention device which opens and closes a communication path. The backflow prevention device includes the valve configured by a valve body and a valve seat. The valve seat is formed around an opening of a melting unit side end portion of the communication path. The valve body advances in a melting unit to be seated on the valve seat, and retracts in the melting unit to be separated from the valve seat.

A material supply device of a light metal injection molding machine in Patent literature 2 (U.S. Pat. No. 10,695,827) is included in an injection device of a light metal injection molding machine. The injection device of a light metal injection molding machine includes the backflow prevention device which opens and closes a communication path. The backflow prevention device includes the valve configured by a valve body and a valve seat. The valve seat is formed around an opening of an injection unit side end portion of the communication path. The valve body advances in an injection unit to be seated on the valve seat, and retracts in the injection unit to be separated from the valve seat.

Sealing performance when the valve body is seated on the valve seat is improved by bringing the valve body and the valve seat into surface-contact with each other. For example, regarding the valve body and the valve seat made of a corrosion-resistant and heat-resistant steel, by a predetermined pressure at which the valve body presses the valve seat, both the valve body and the valve seat are elastically deformed and come into surface-contact with each other.

However, for example, when the valve body and the valve seat made of a corrosion-resistant and heat-resistant steel are exposed to an aluminum molten metal, the surfaces of the valve body and the valve seat may be unevenly melting-damaged even for the corrosion-resistant and heat-resistant steel, and the valve body and the valve seat may be difficult to come into surface-contact with each other even if they are elastically deformed when the valve body is seated.

The surfaces of the valve body and the valve seat made of a ceramic are not melting-damaged even when the valve body and the valve seat are exposed to the aluminum molten metal, for example. However, generally, the ceramic is a material which has a higher hardness than that of the corrosion-resistant and heat-resistant steel, and the amount of elastic deformation under an external force is smaller than that of the corrosion-resistant and heat-resistant steel, resulting in brittle fracture without plastic deformation. The valve body and the valve seat made of a ceramic cannot be expected to come into surface-contact with each other by being elastically deformed, and thus high processing precision is required for the surface to be contacted. Furthermore, the valve body and the valve seat made of a ceramic may be chipped or cracked when the valve body is pressed against the valve seat at a large pressure in a state in which the valve body and the valve seat are in local contact with each other.

Therefore, the disclosure is to propose a backflow prevention device of a light metal injection device and a backflow prevention method of a light metal injection device, on one hand, which can seat the valve body made of a heat-resistant and corrosion-resistant steel on the valve seat made of a high-hardness ceramic and cause the valve body to deform elastically, and thereby bring the valve body and the valve seat into surface-contact with each other to easily obtain required sealing performance; on the other hand, which can easily detect the replacement time of the valve body that gradually wears out due to melting damage, plastic deformation or the like compared to the ceramic that has high-hardness and is not melting-damaged, and replace the valve body in a timely and easy manner to easily maintain and manage the required sealing performance. Additional features of the disclosure will be set forth in the description that follows.

SUMMARY

A backflow prevention device of a light metal injection device of the disclosure connects a melting unit which melts an unmelted light metal material into a molten metal and an injection unit which injects the metered molten metal into a mold by a communication path, opens the communication path when the molten metal in the melting unit is supplied to the injection unit, and closes the communication path when the molten metal in the injection unit is injected to the mold. The backflow prevention device of a light metal injection device includes: a valve which has a valve body made of a corrosion-resistant and heat-resistant steel and a valve seat made of a ceramic, and in which the valve body advances and is seated on the valve seat to close the communication path, and the valve body retracts and is separated from the valve seat to open the communication path; a valve body drive device which moves a drive body to which the valve body is connected in the front-rear direction together with the valve body; a position sensor which detects that the drive body has reached at least a predetermined advance limit position and outputs a signal indicating that the drive body has reached the predetermined position; and a valve body drive control device which connects the valve body drive device and the position sensor respectively, and controls the valve body drive device based on the signal of the position sensor.

A backflow prevention method of a light metal injection device of the disclosure connects a melting unit which melts an unmelted light metal material into a molten metal and an injection unit which injects the molten metal into a mold by a communication path, opens the communication path when the molten metal in the melting unit is supplied to the injection unit, and closes the communication path when the molten metal in the injection unit is injected to the mold. In the backflow prevention method of a light metal injection device, a valve body made of a corrosion-resistant and heat-resistant steel advances, and the valve body is seated on a valve seat made of a ceramic, thereby closing the communication path; the valve body retracts, and the valve body is separated from the valve seat, thereby opening the communication path; and a position sensor detects that a drive body which is connected to the valve body and is moved forward and backward by a valve body drive device has reached a predetermined advance limit position, and thereby it is detected that a wear-and-tear amount of the length of the valve body in the front-rear direction has reached an allowable maximum wear-and-tear amount.

DESCRIPTION OF THE EMBODIMENTS

Figure 1:
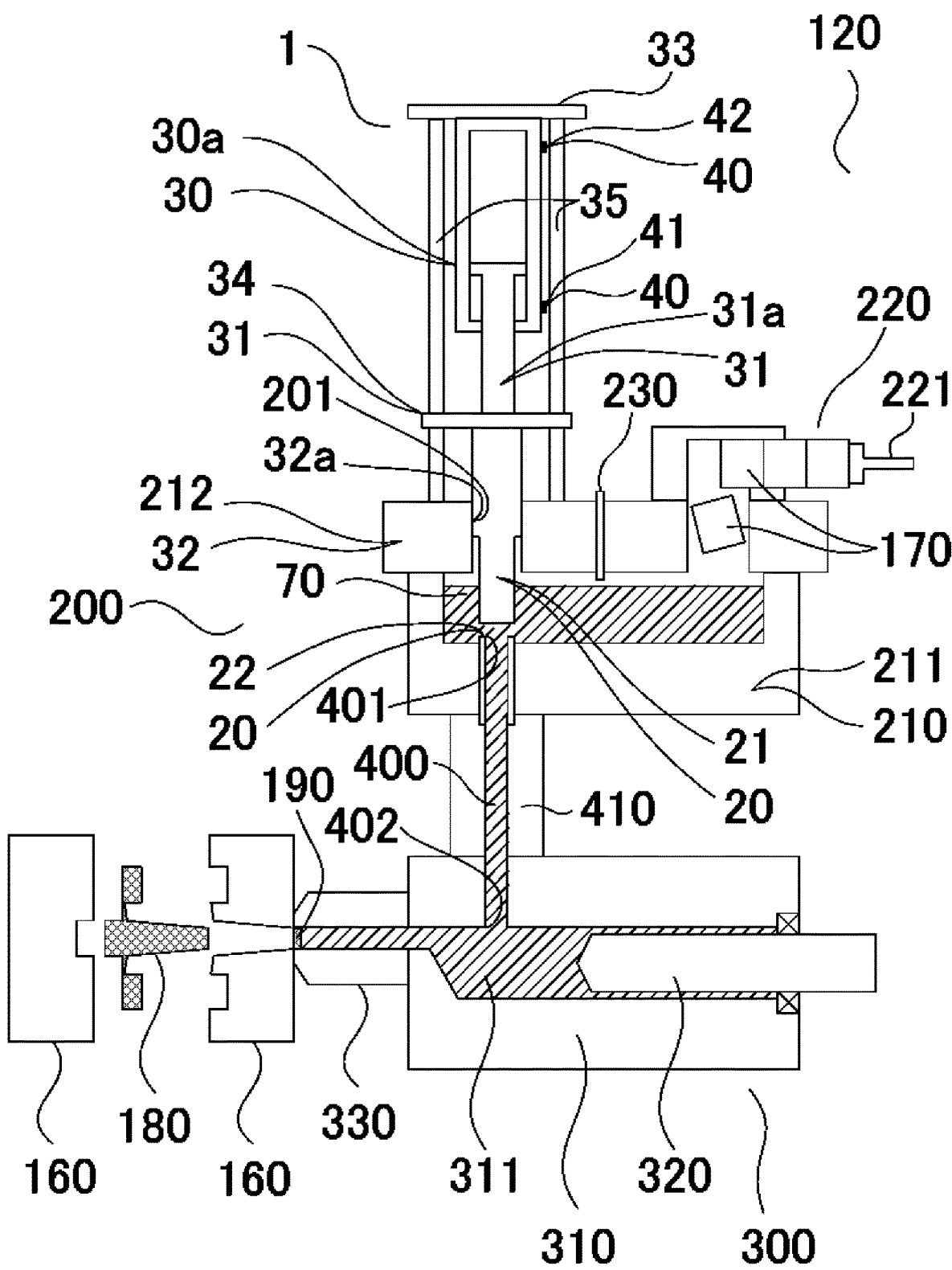
FIG. 1 is a schematic view showing a light metal injection device on which a backflow prevention device of the disclosure is mounted.
Figure 2:
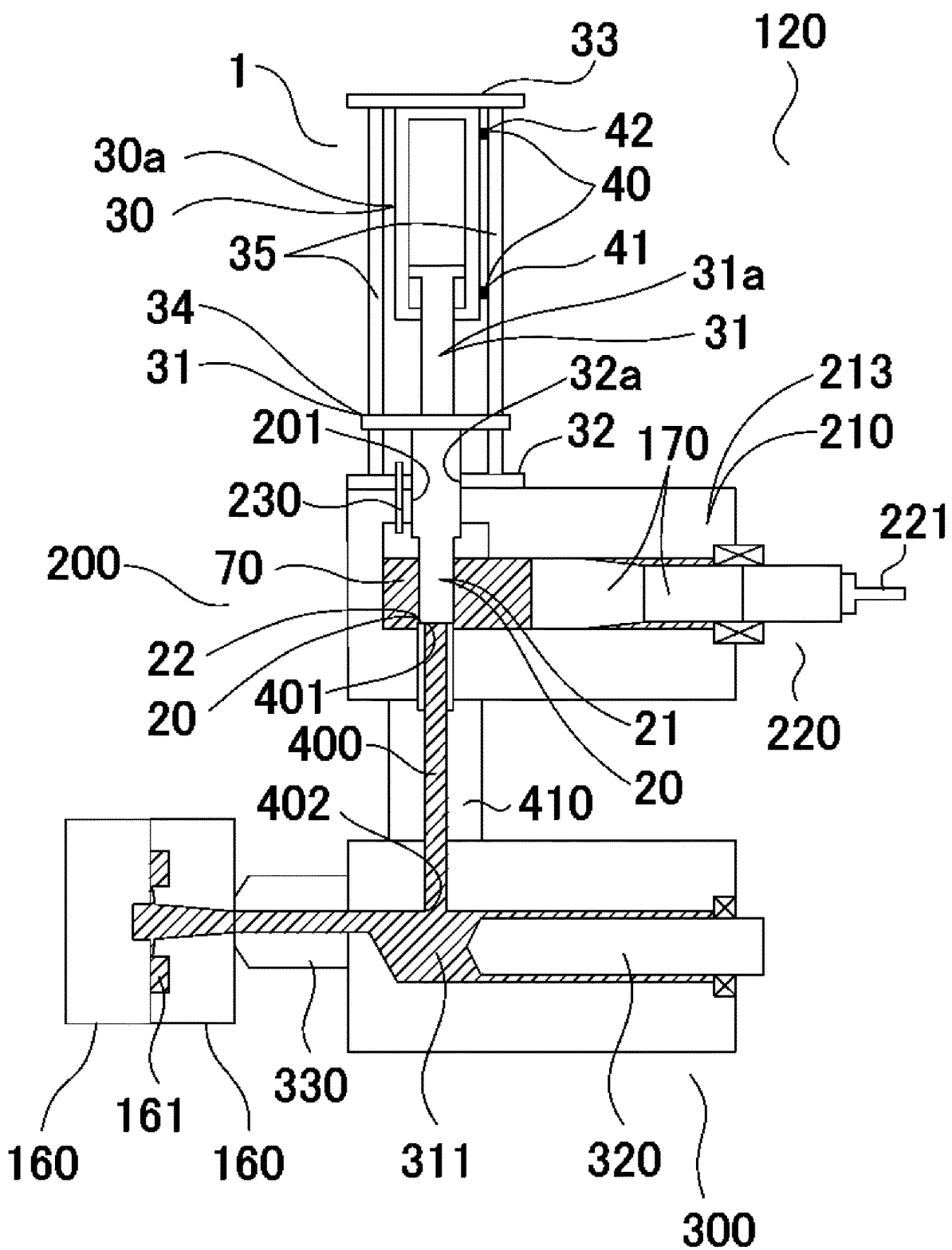
FIG. 2 is a schematic view showing another light metal injection device on which the backflow prevention device of the disclosure is mounted.
Figure 3:
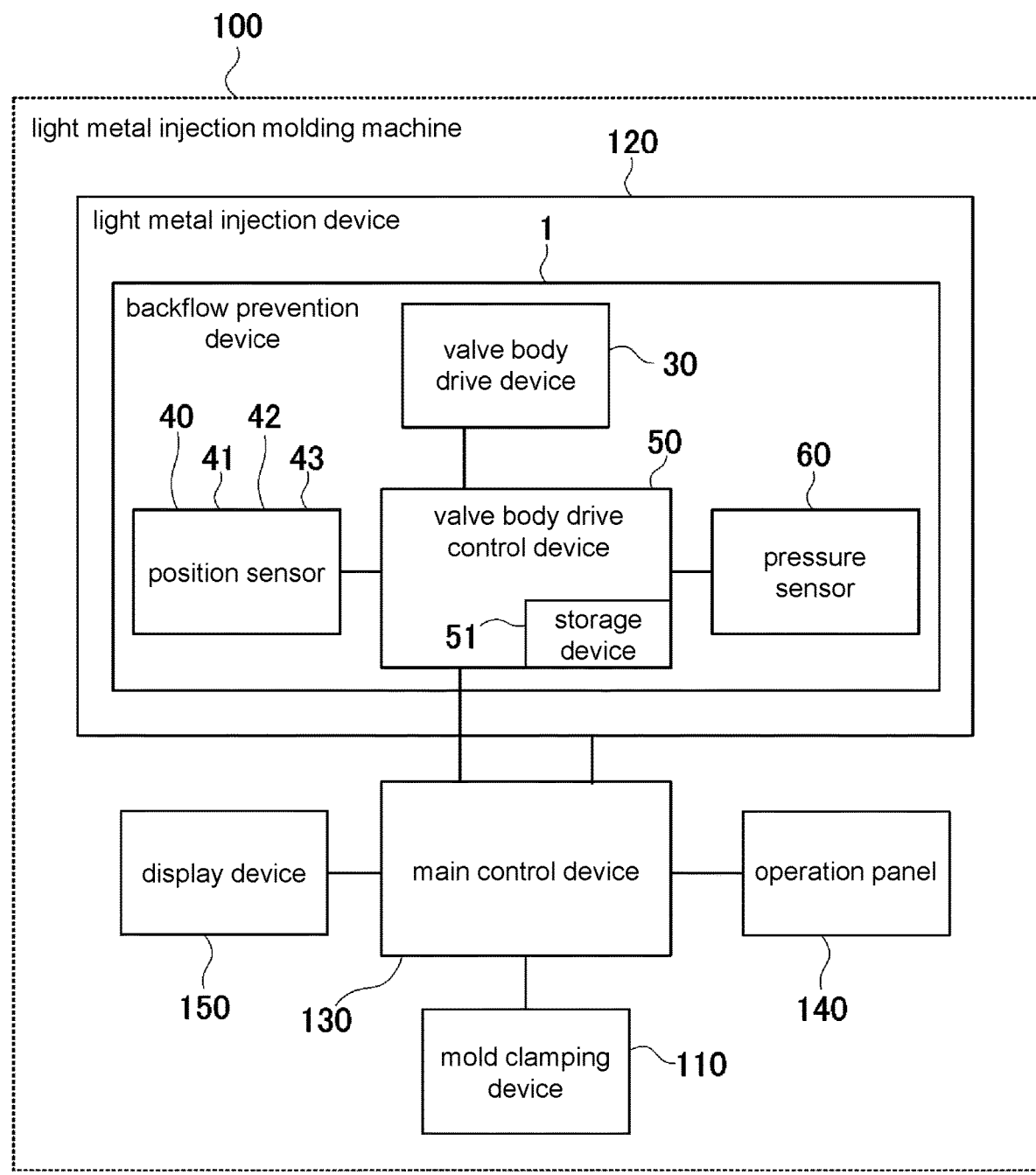
FIG. 3 is a block diagram showing an outline of the light metal injection device on which the backflow prevention device of the disclosure is mounted and is a block diagram showing an outline of a light metal injection molding machine including the light metal injection device.
Figure 4:
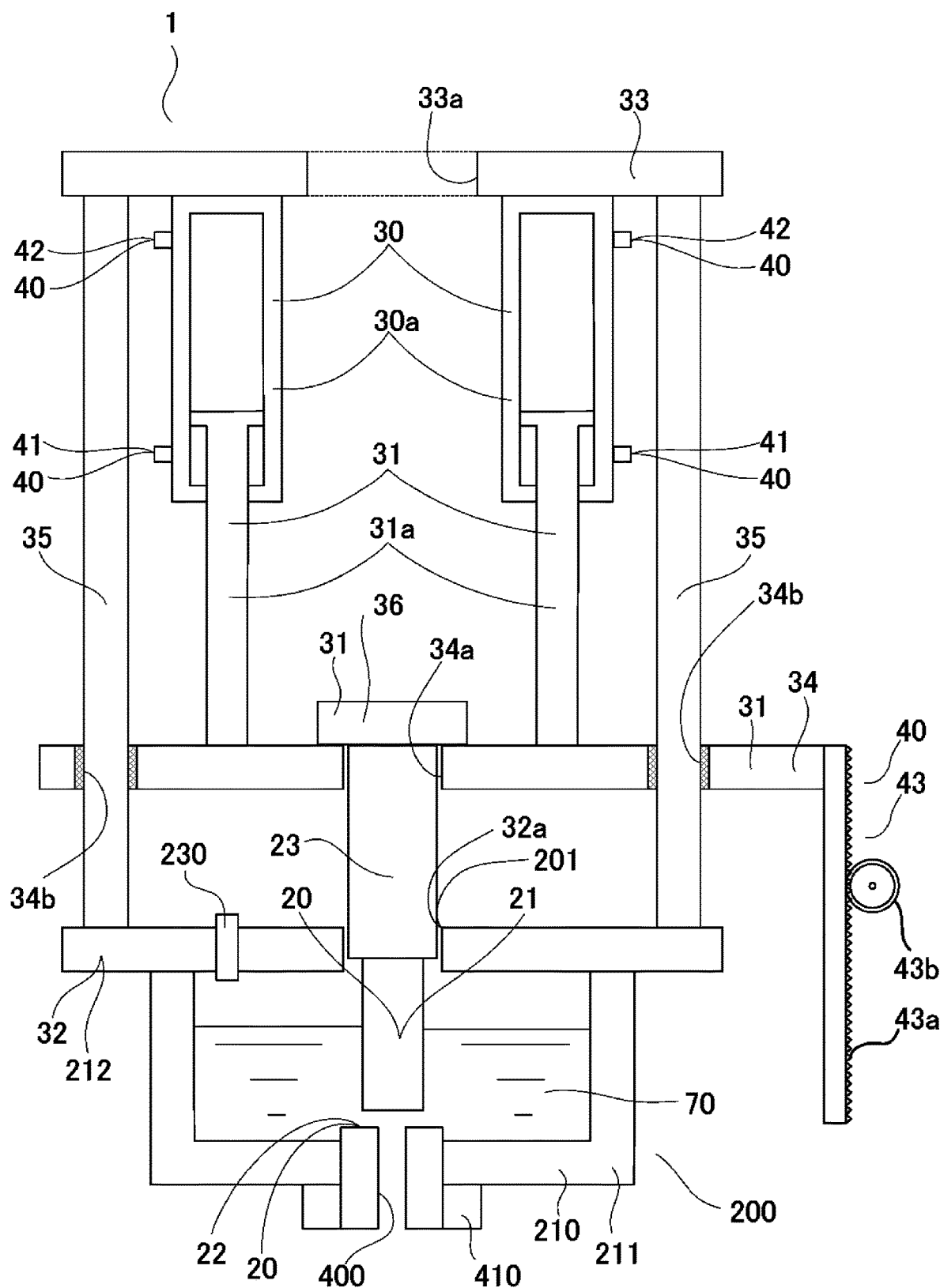
FIG. 4 is a schematic view showing the backflow prevention device of the disclosure.
Figure 5:
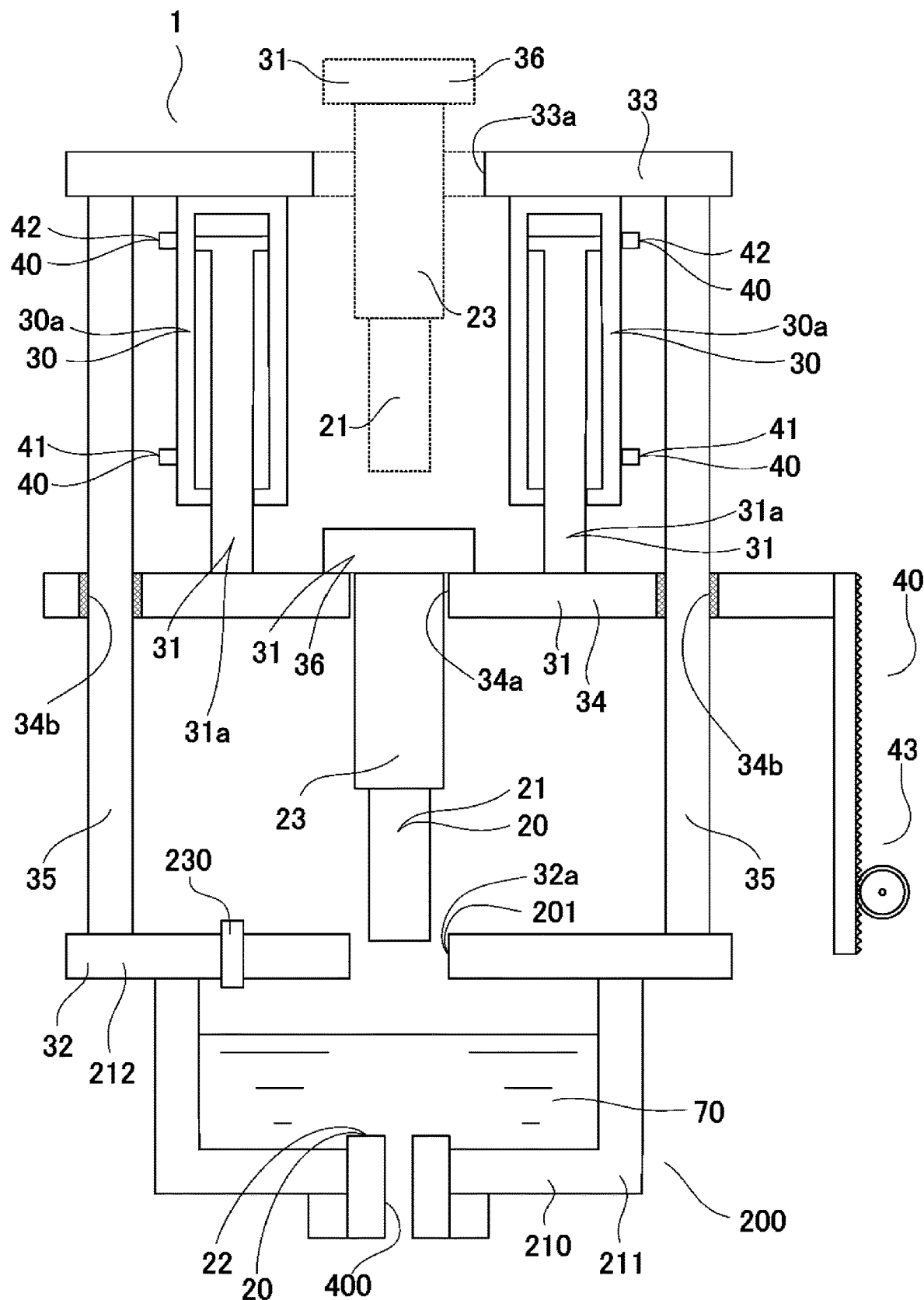
FIG. 5 is a schematic view showing a state in which a valve body is attached.
Figure 6:
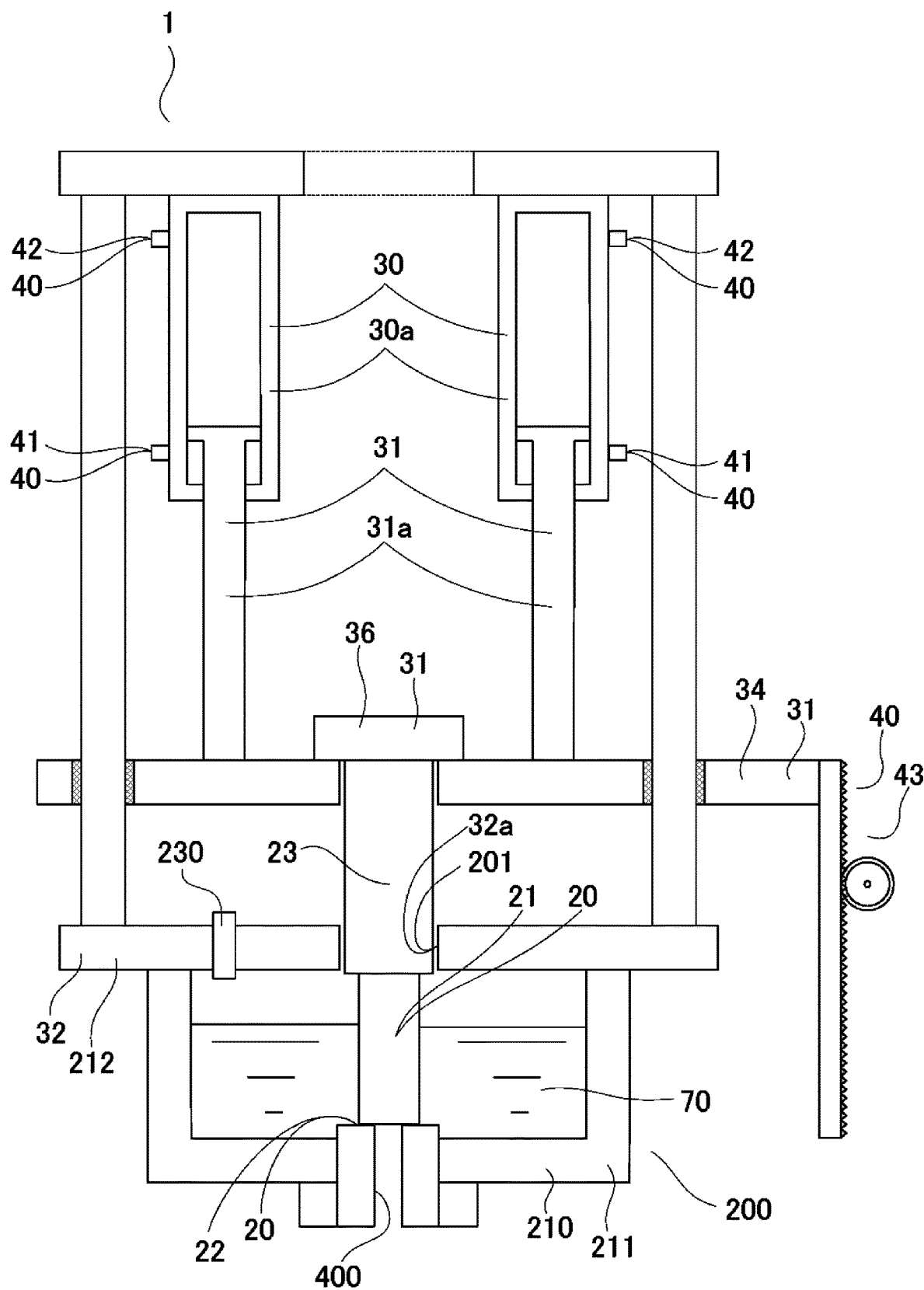
FIG. 6 is a schematic view showing a state in which the valve body is seated on a valve seat and a communication path is closed.
Figure 7:
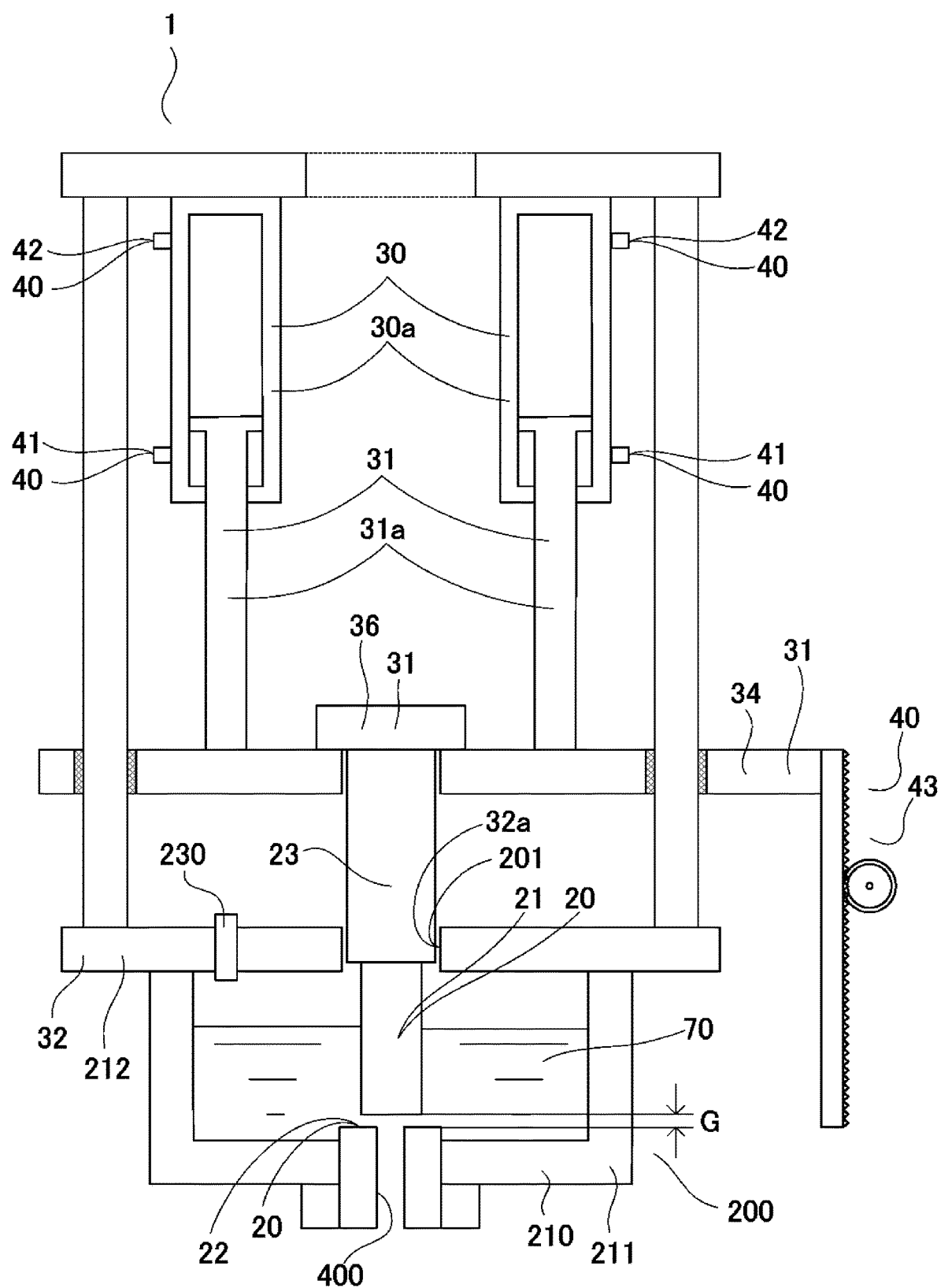
FIG. 7 is a schematic view showing a state in which the valve body is separated from the valve seat by a predetermined distance and the communication path is opened.
Figure 8:
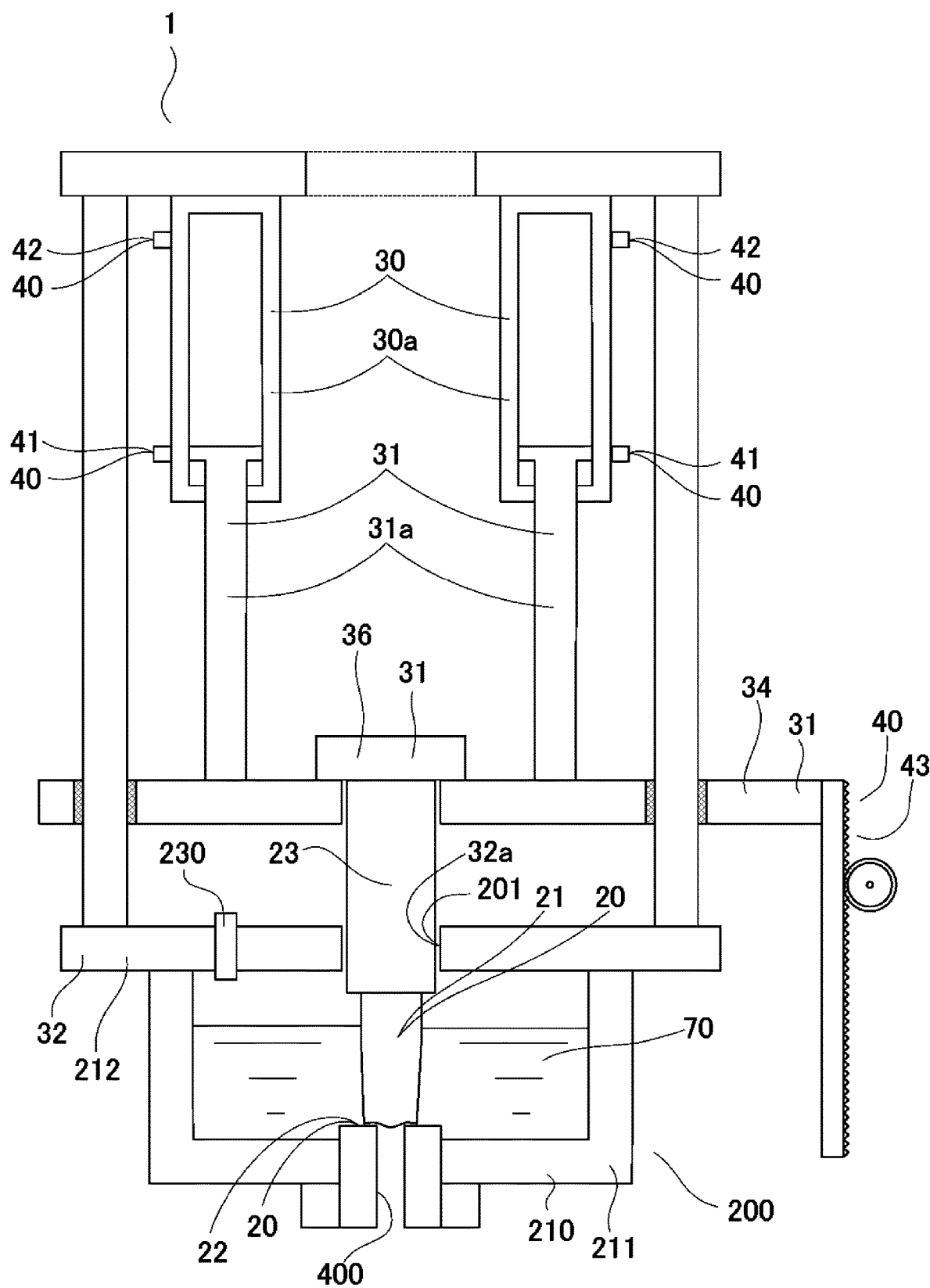
FIG. 8 is a schematic view showing a state in which a worn valve body has reached a predetermined advance limit position before the valve body is seated.
Figure 9:
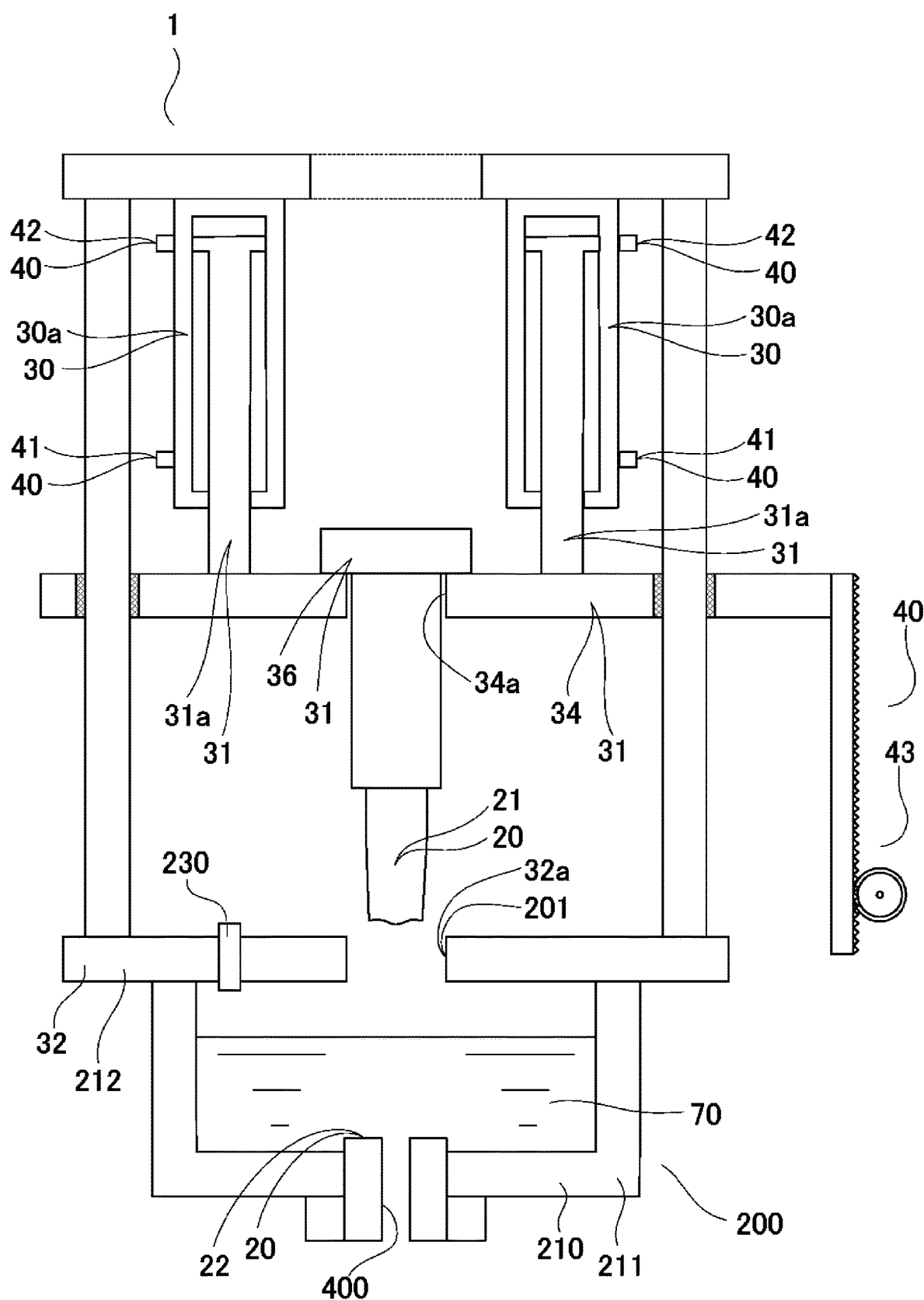
FIG. 9 is a schematic view showing a state in which the valve body has retracted to a retreat position.
Figure 10:
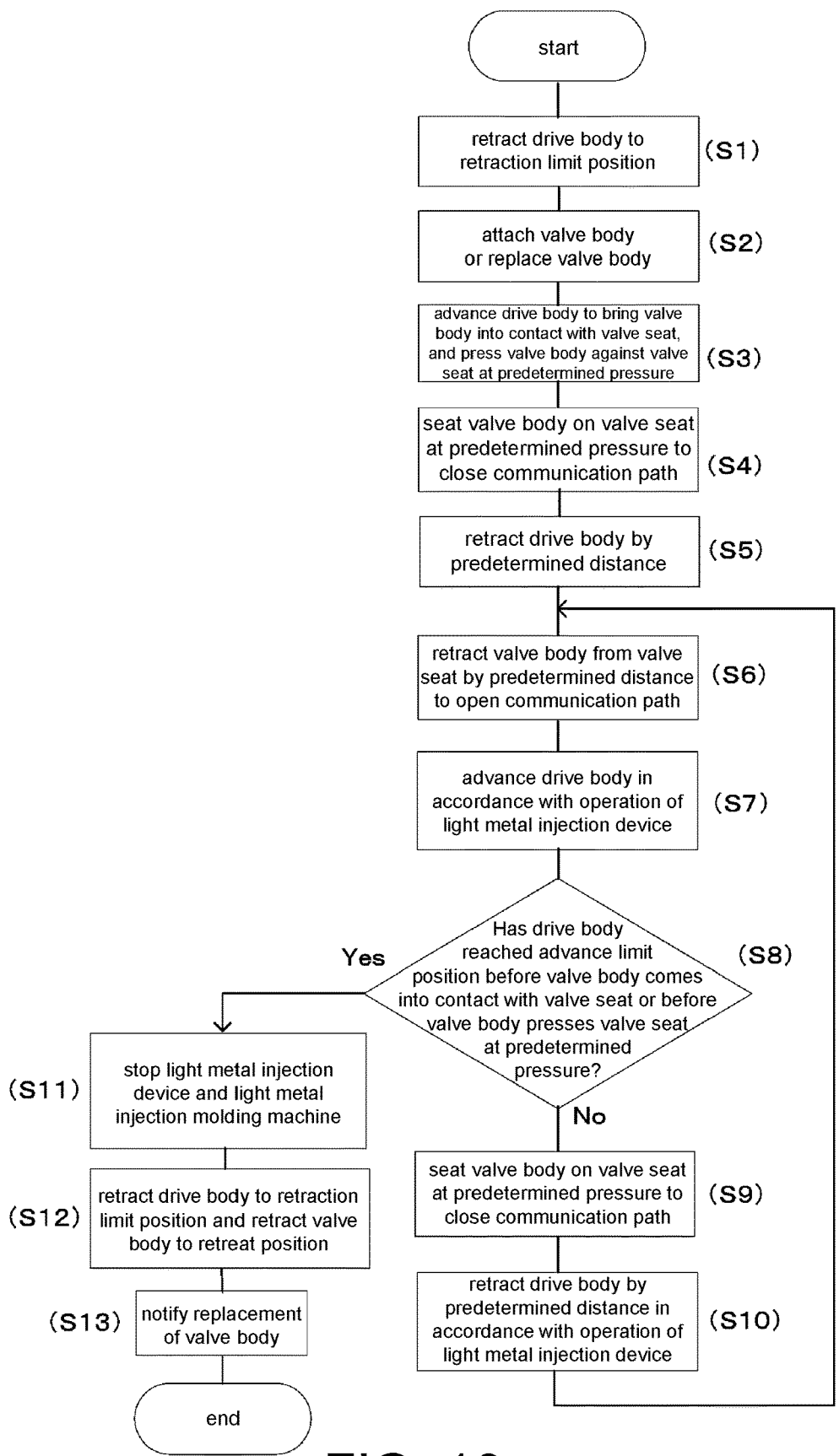
FIG. 10 is a flow diagram showing an operation flow of the backflow prevention device of the disclosure.
Figure 11:
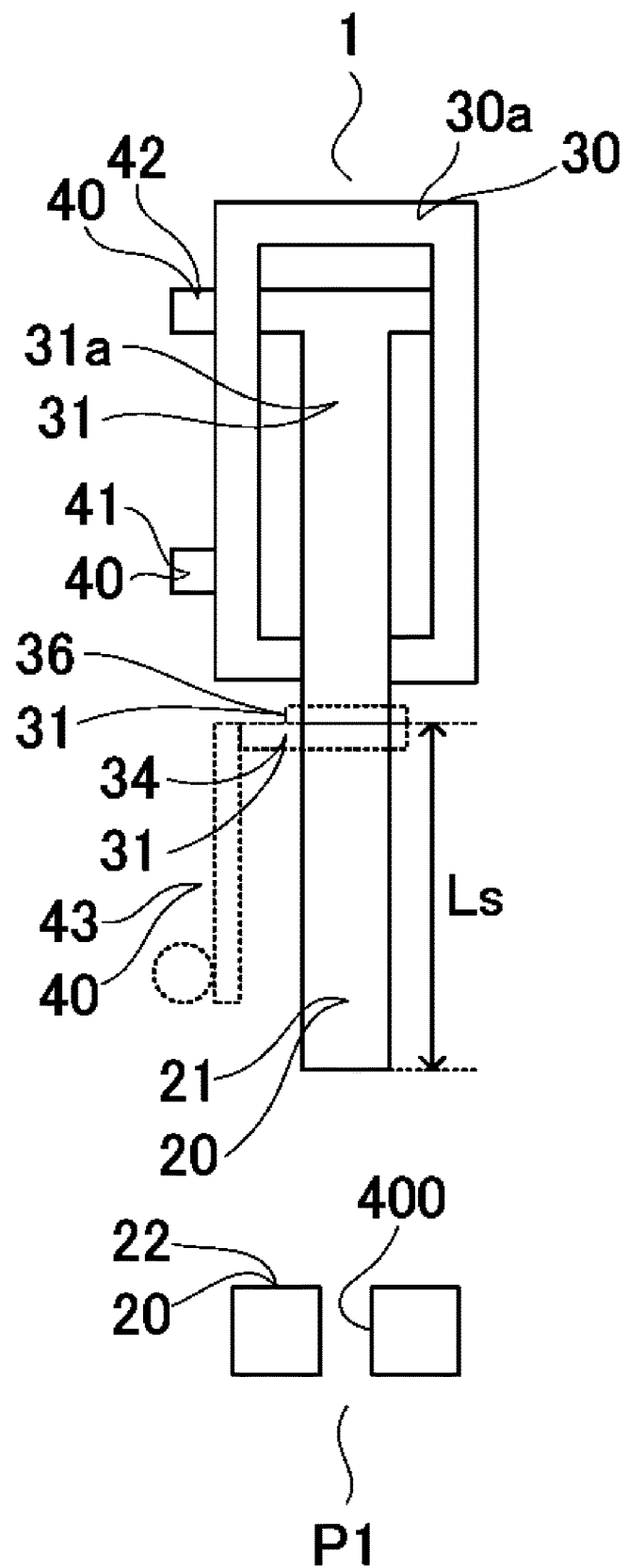
FIG. 11 is a schematic view showing a first state of the backflow prevention device of the disclosure.
Figure 12:
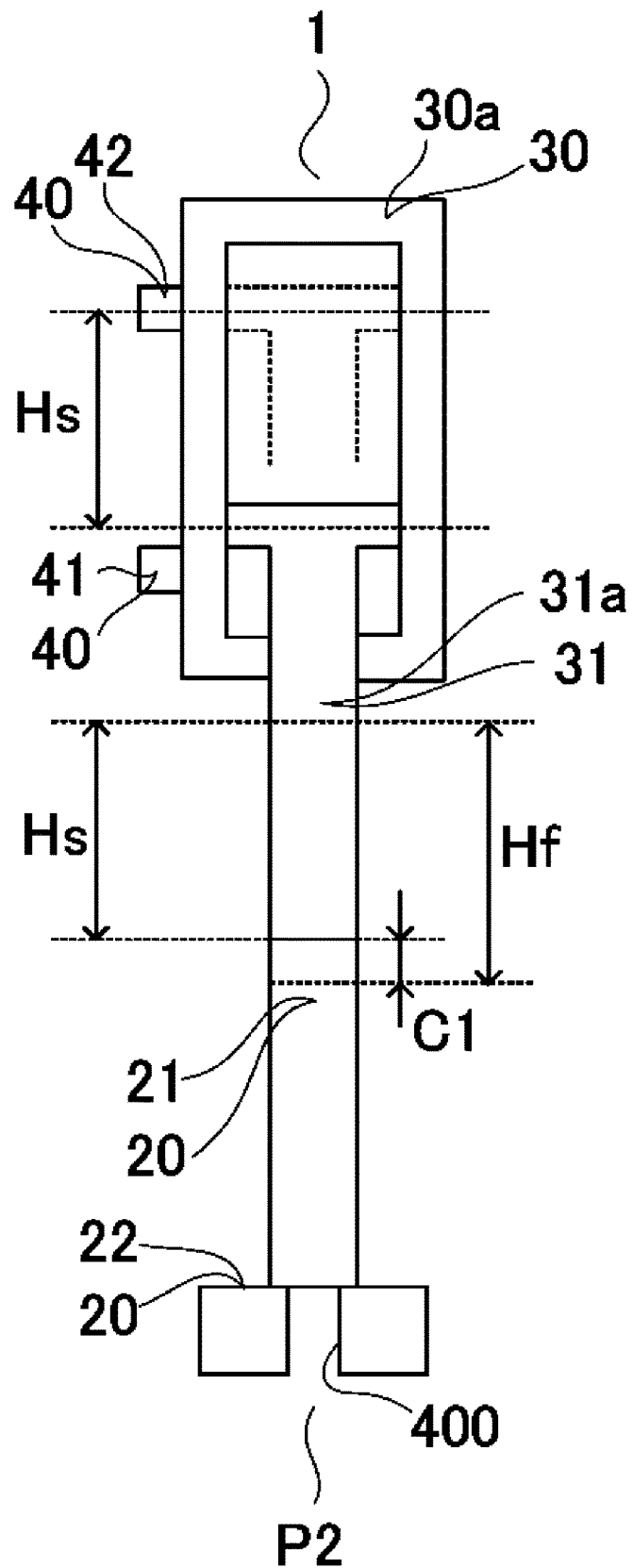
FIG. 12 is a schematic view showing a second state of the backflow prevention device of the disclosure.
Figure 13:
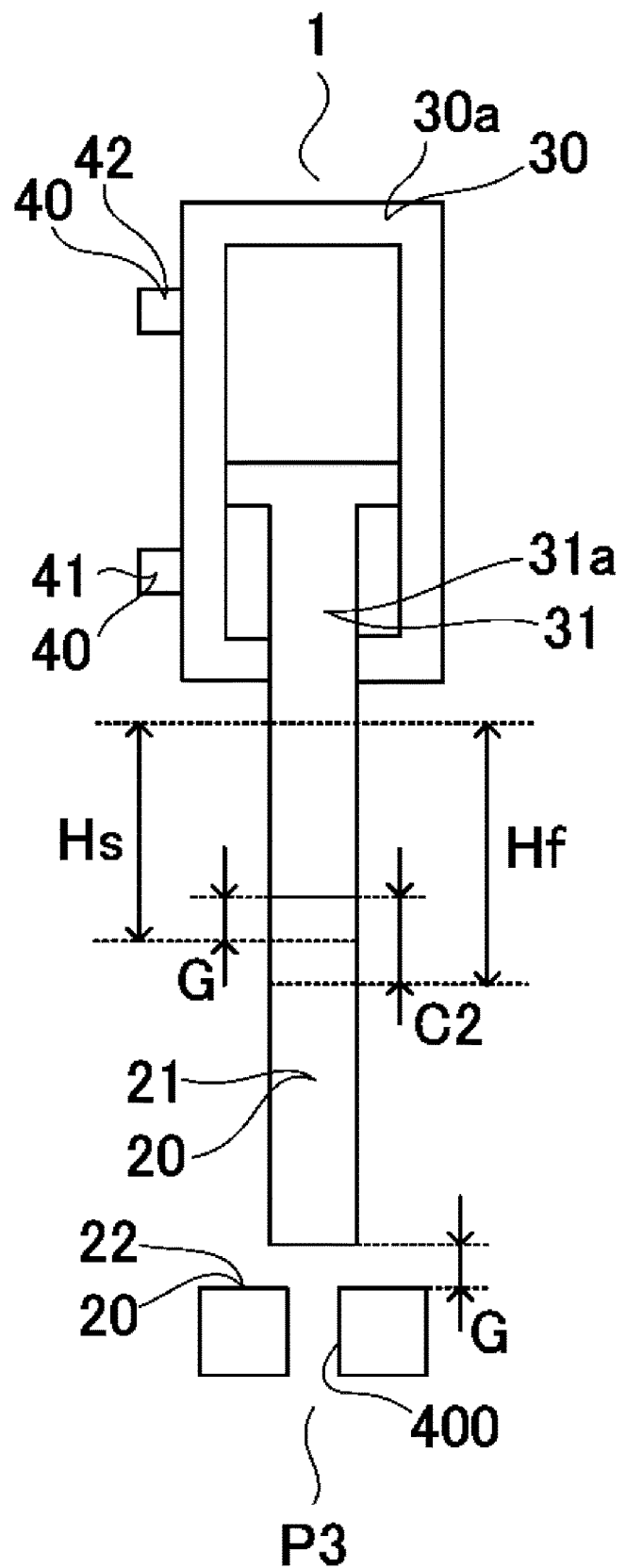
FIG. 13 is a schematic view showing a third state of the backflow prevention device of the disclosure.
Figure 14:
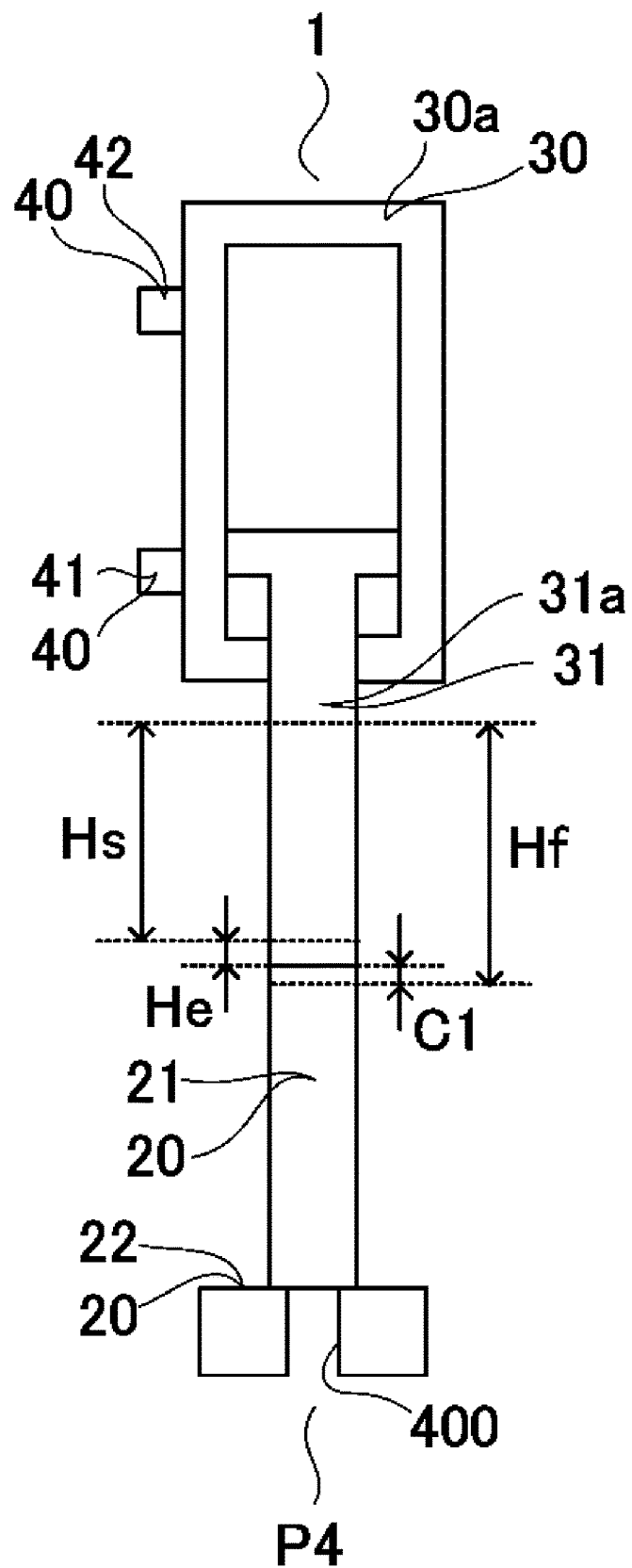
FIG. 14 is a schematic view showing a fourth state of the backflow prevention device of the disclosure.
Figure 15:
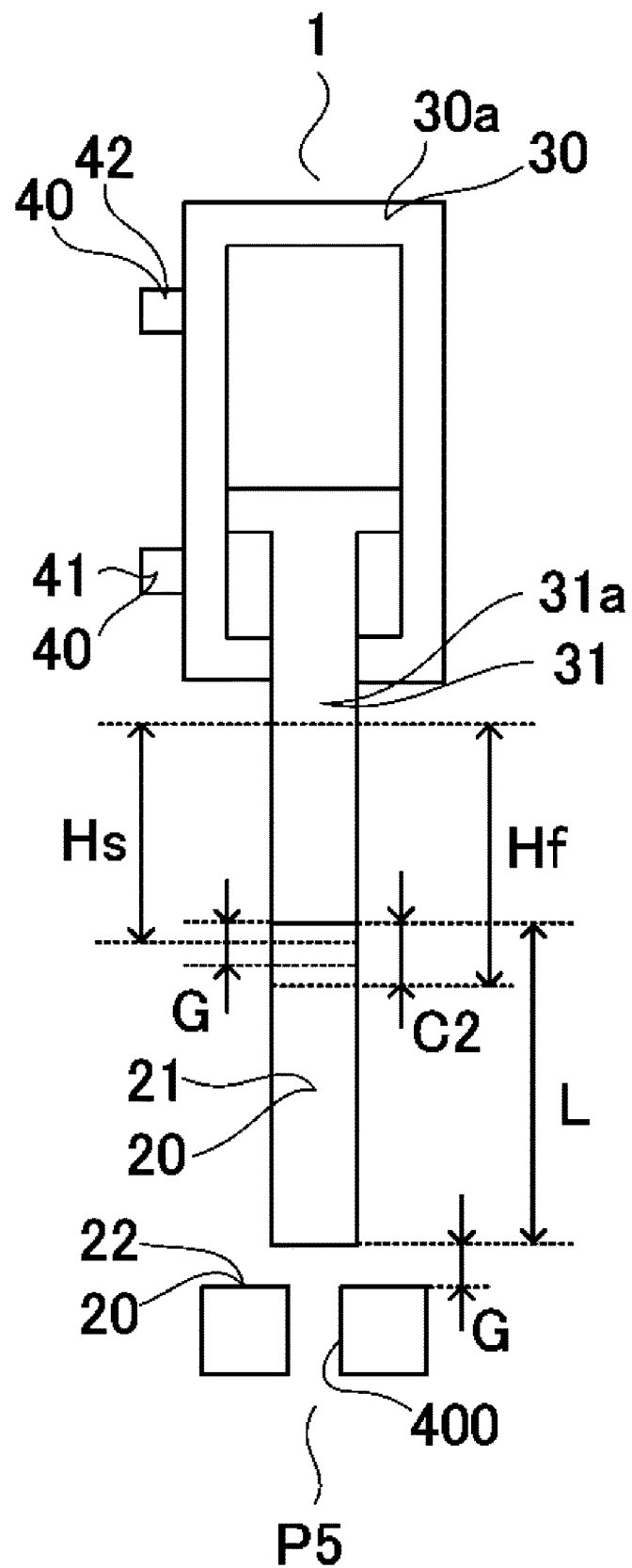
FIG. 15 is a schematic view showing a fifth state of the backflow prevention device of the disclosure.
Figure 16:
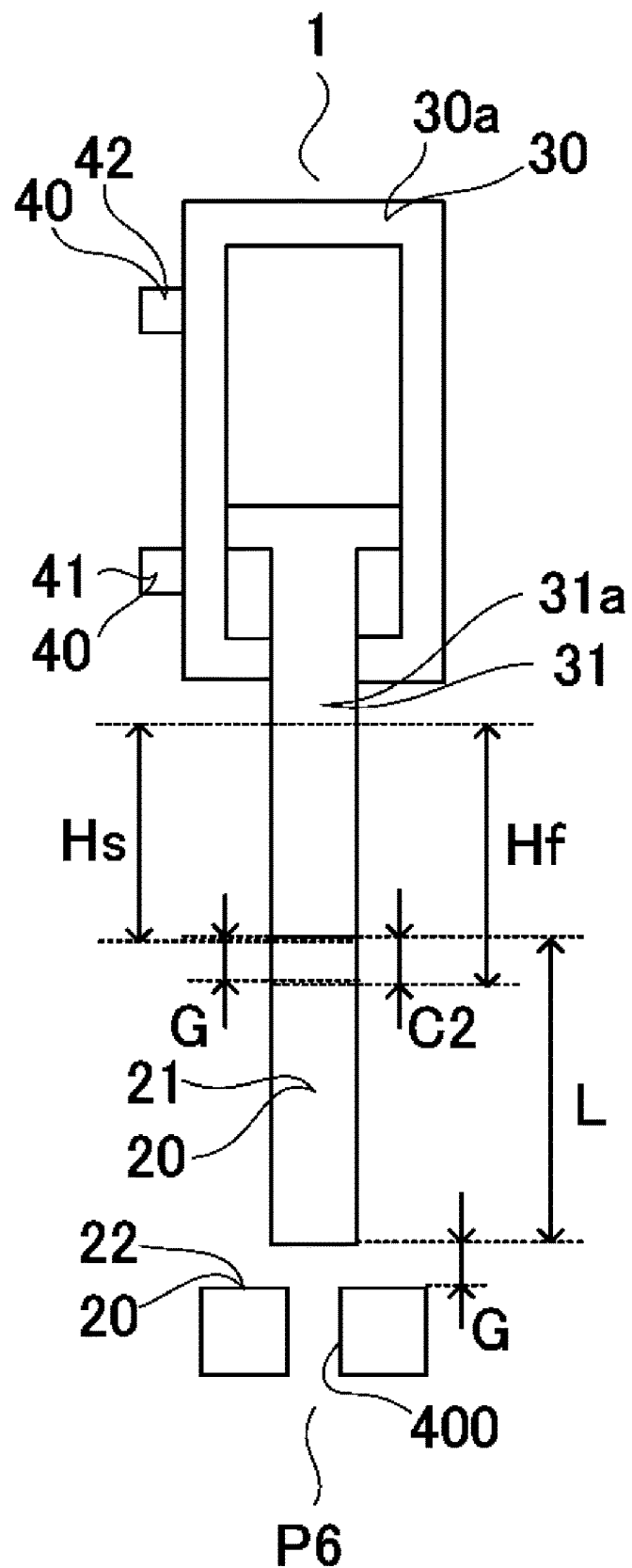
FIG. 16 is a schematic view showing a sixth state of the backflow prevention device of the disclosure.
Figure 17:
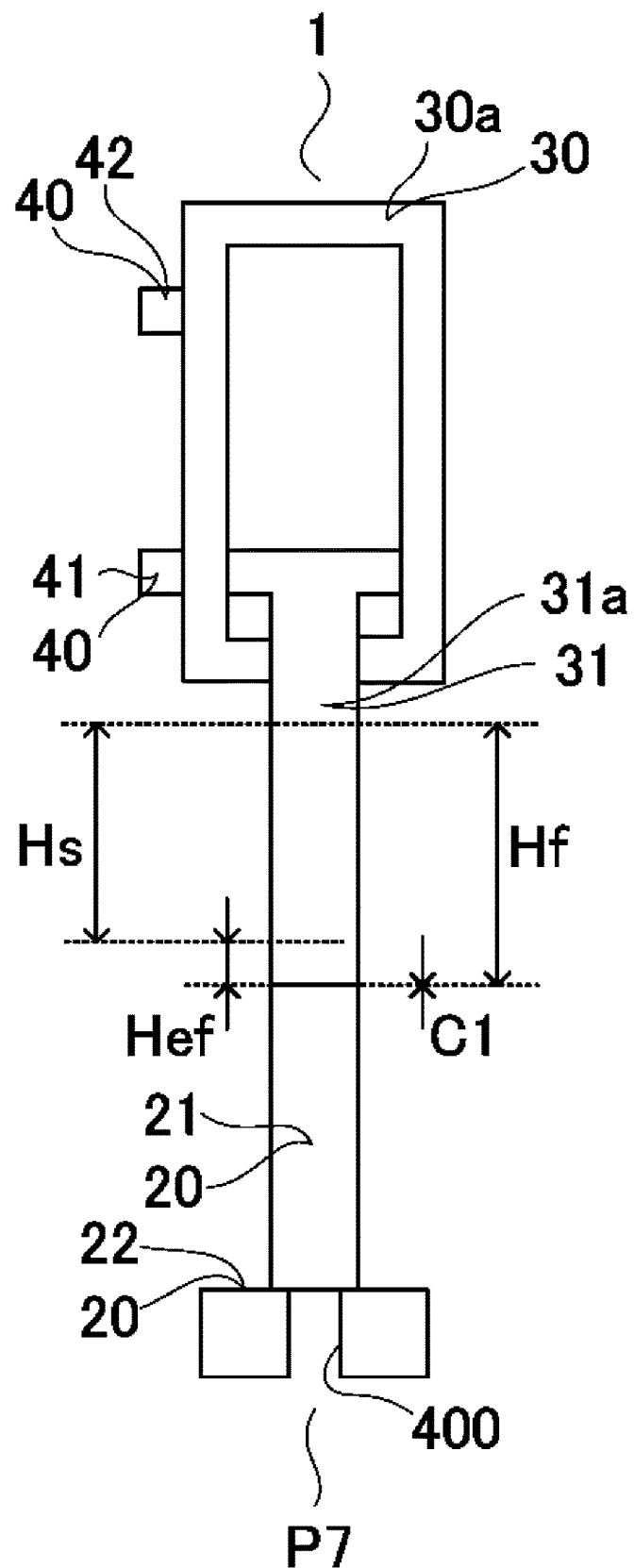
FIG. 17 is a schematic view showing a seventh state of the backflow prevention device of the disclosure.
Figure 18:
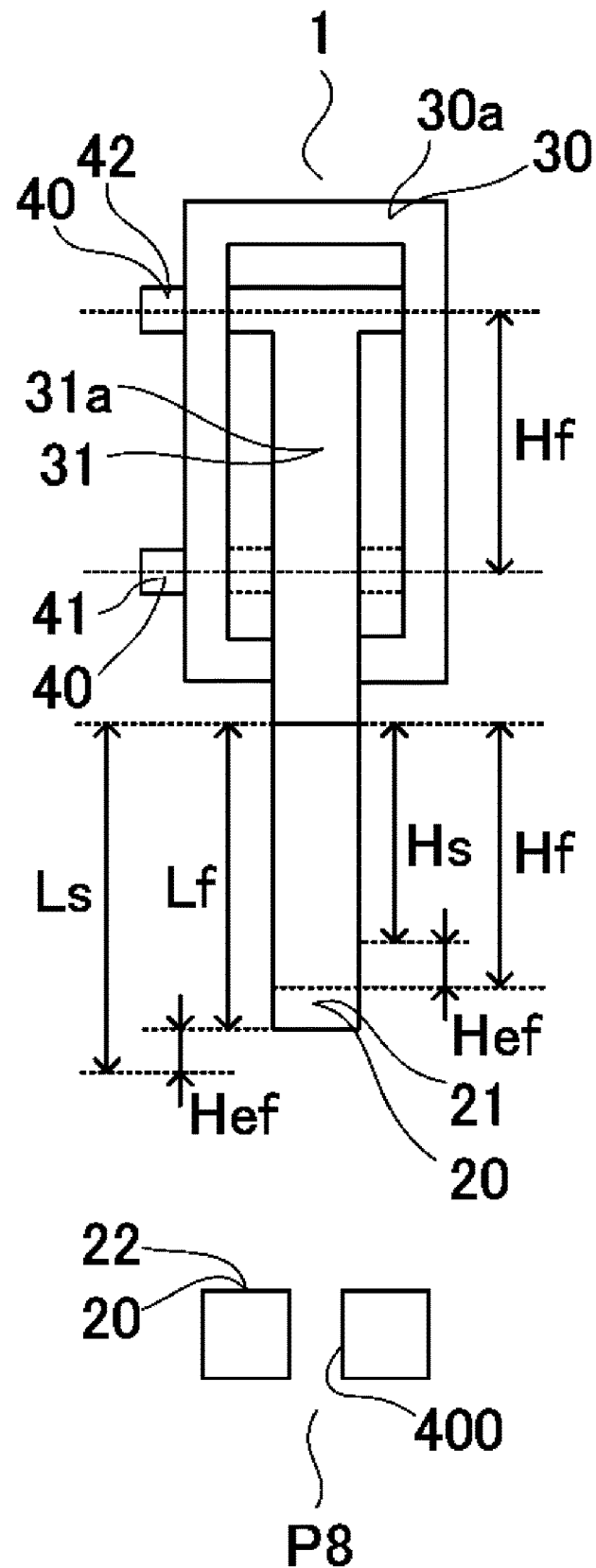
FIG. 18 is a schematic view showing an eighth state of the backflow prevention device of the disclosure.

A backflow prevention device of a light metal injection device of the disclosure is described by using an example of an embodiment shown in FIGS. 1 to 11. FIG. 1 is a schematic view showing a light metal injection device on which a backflow prevention device of the disclosure is mounted. FIG. 2 is a schematic view showing another light metal injection device on which the backflow prevention device of the disclosure is mounted. FIG. 3 is a block diagram showing an outline of the light metal injection device on which the backflow prevention device of the disclosure is mounted and is a block diagram showing an outline of a light metal injection molding machine including the light metal injection device. FIG. 4 is a schematic view showing the backflow prevention device of the disclosure. FIG. 5 is a schematic view showing a state in which a valve body is attached. FIG. 6 is a schematic view showing a state in which the valve body is seated on a valve seat and a communication path is closed. FIG. 7 is a schematic view showing a state in which the valve body is separated from the valve seat by a predetermined distance and the communication path is opened. FIG. 8 is a schematic view showing a state in which a worn valve body has reached a predetermined advance limit position before the valve body is seated. FIG. 9 is a schematic view showing a state in which the valve body has retracted to a retreat position. FIG. 10 is a flow diagram showing an operation flow of the backflow prevention device of the disclosure. FIG. 11 is a schematic view showing a first state of the backflow prevention device of the disclosure. FIG. 12 is a schematic view showing a second state of the backflow prevention device of the disclosure. FIG. 13 is a schematic view showing a third state of the backflow prevention device of the disclosure. FIG. 14 is a schematic view showing a fourth state of the backflow prevention device of the disclosure. FIG. 15 is a schematic view showing a fifth state of the backflow prevention device of the disclosure. FIG. 16 is a schematic view showing a sixth state of the backflow prevention device of the disclosure. FIG. 17 is a schematic view showing a seventh state of the backflow prevention device of the disclosure. FIG. 18 is a schematic view showing an eighth state of the backflow prevention device of the disclosure.

As shown in FIGS. 1 to 3, a backflow prevention device 1 of a light metal injection device 120 of the disclosure is used in the light metal injection device 120 included in a light metal injection molding machine 100.

The light metal injection molding machine 100 at least includes a mold clamping device 110, the light metal injection device 120, and a main control device 130 which controls the mold clamping device 110 and the light metal injection device 120. The mold clamping device 110 and the light metal injection device 120 respectively include various drive portions and various sensors. The main control device 130 is connected to the mold clamping device 110 and the light metal injection device 120, and controls the mold clamping device 110 and the light metal injection device 120. In addition, the light metal injection molding machine 100 includes an operation panel 140 and a display device 150. The operation panel 140 and the display device 150 are connected to the main control device 130. The operation panel 140 is used when an operation of the light metal injection molding machine 100 and input of various settings of the light metal injection molding machine 100 are performed. The display device 150 displays various settings of the light metal injection molding machine 100 and the condition of each device.

The mold clamping device 110 mounts a mold 160. The mold clamping device 110 opens and closes the mold 160, and clamps the closed mold 160. The mold clamping means further tightening of the closed mold 160 in a closed direction. A cavity space 161 is formed in the closed mold 160.

The light metal injection device 120 melts an unmelted light metal material 170 into a molten metal 70 and temporarily stores the molten metal 70. Furthermore, the light metal injection device 120 injects the metered melted metal 70 into the cavity space 161 of the mold 160. The molten metal 70 in the cavity space 161 is cooled and solidified to become a molded product 180.

The mold 160 is opened and the molded product 180 is taken out. Because the molded product 180 is attached to the opened mold 160, the molded product 180 is taken out from the mold 160 by being ejected, for example, with an ejector pin (not shown) included in the mold 160. The ejector pin is driven by an ejection device (not shown) included in the mold clamping device 110.

The main control device 130 controls the mold clamping device 110 and the light metal injection device 120 to sequentially implement a mold closing step, a mold clamping step, a metering step, an injection step, a cooling step, a mold opening step, and an ejection step in one molding cycle, for example. The main control device 130 controls the light metal injection device 120 to melt the unmelted light metal material 170 into the molten metal 70 in a timely manner and temporarily store the molten metal 70. Moreover, for example, the metering step may be implemented in parallel with other steps excluding the injection step.

The mold closing step is a step of closing the mold 160. The mold clamping step is a step of clamping the mold 160. The metering step is a step of metering the molten metal 70. The injection step is a step of injecting the metered molten metal 70 into the cavity space 161. The cooling step is a step of cooling and solidifying the molten metal 70 in the mold 160. The mold opening step is a step of opening the mold 160. The ejection step is a step of ejecting the molded product 180 from the opened mold 160.

In addition, the injection step includes at least a filling step. The filling step is a step of filling the molten metal 70 into the empty cavity space 161. In addition, the injection step may include a pressure holding step implemented after the filling step if necessary. The pressure holding step is a step of continuing a filling operation at a predetermined holding pressure even after the filling step until the molten metal at the gate part of the cavity space 161 is solidified or until a cold plug 190 is generated. The cold plug 190 is obtained by solidifying the molten metal 70 in a front end portion of an injection nozzle 330 described later.

Hereinafter, the light metal injection device 120 is described in detail. As shown in FIG. 1 and FIG. 2, the light metal injection device 120 includes a melting unit 200, an injection unit 300, a communication path 400, and the backflow prevention device 1.

The melting unit 200 includes a melting furnace 210 and a material supply device 220. In addition, the melting unit 200 may include a liquid surface level sensor 230 which detects a position of a liquid surface in the height direction (hereinafter referred to as a liquid surface level) of the molten metal 70 temporarily stored in the melting furnace 210.

The melting furnace 210 heats the unmelted light metal material 170 supplied from the material supply device 220 by a heater (not shown) to melt the unmelted light metal material 170 into a molten metal, and heats and temporarily stores the molten metal. The melting furnace 210 may be, for example, a bucket type melting furnace 211 as shown in FIG. 1. An upper opening portion of the bucket type melting furnace 211 may be covered by a lid member 212. The melting furnace 210 may also be, for example, a horizontally long melting cylinder 213 as shown in FIG. 2. The heater is wound around an outer circumference of the melting furnace 210 for example. Moreover, the inside of the melting unit 200 indicates the inside of the melting furnace 210 and the inside of a cylinder hole of the melting cylinder 213.

The material supply device 220 supplies the unmelted light metal material 170 into the melting furnace 210. The main control device 130 controls the material supply device 220 so that the liquid surface level of the molten metal 70 in the melting furnace 210, which is detected by the liquid surface level sensor 230, becomes a predetermined liquid surface level.

As shown in FIG. 1, if the melting unit 200 is the bucket type melting furnace 211, the material supply device 220 may be configured to carry and supply a lump of the unmelted light metal material 170, by a pusher 221 or the like, into the bucket type melting furnace 211 from a material feed port which is formed in a part of the lid member 212 covering the upper opening portion of the bucket type melting furnace 211. In addition, as shown in FIG. 2, if the melting unit 200 is the horizontally long melting cylinder 213, the material supply device 220 may be configured to push and supply the unmelted light metal material 170 formed in a cylindrical shape, by the pusher 221, into a cylinder hole formed on a rear end surface of the melting cylinder 213 from an opening portion of the cylinder hole. In addition, if the melting unit 200 is the horizontally long melting cylinder 213, the material supply device 220 may also be configured to supply a lump of the unmelted light metal material 170 into the cylinder hole from a material feed port (not shown) which is formed upward at a rear portion of the melting cylinder 213.

The injection unit 300 includes an injection cylinder 310, a plunger 320, an injection drive device (not shown), and the injection nozzle 330.

The injection cylinder 310 accommodates the molten metal 70 supplied from the melting unit 200 into the cylinder hole, and temporarily stores the molten metal 70 while heating the molten metal 70 by the heater (not shown) wound around an outer circumference.

The plunger 320 is accommodated to be slidable forward and backward in the cylinder hole of the injection cylinder 310. The molten metal 70 is supplied to an injection chamber 311 which is formed inside the cylinder hole of the injection cylinder 310 and in front of a front end surface of the plunger 320. The molten metal 70 is metered by the position where the plunger 320 is retracted. The plunger 320 advances, and thereby the molten metal 70 is injected into the mold 160 through the injection nozzle 330. Moreover, the inside of the injection unit 300 indicates the inside of the injection chamber 311.

The injection drive device is connected to a rear end portion of the plunger 320, and drives the plunger 320 forward and backward. The injection drive device is controlled by the main control device 130.

The injection nozzle 330 is attached to a front end surface of the injection cylinder 310. The injection nozzle 330 is equipped with an injection hole for communicating the inside of the mold 160 and the inside of the injection unit 300 when the injection nozzle 330 is in contact with the mold 160. The injection nozzle 330 heats the molten metal 70 in the injection hole by the heater (not shown) wound around an outer circumference.

A communication path 400 is formed, for example, in a connection member 410 which connects the melting unit 200 and the injection unit 300. The communication path 400 communicates the inside of the melting unit 200 and the inside of the injection unit 300. A melting unit side end portion 401 of the communication path 400 opens inside the melting unit 200. An injection unit side end portion 402 of the communication path 400 opens inside the injection unit 300. The connection member 410 heats the molten metal 70 in the communication path 400 by the heater (not shown) that is wound.

For example, as shown in FIG. 1, the backflow prevention device 1 opens the communication path 400 when the molten metal 70 in the melting unit 200 is supplied into the injection unit 300. For example, as shown in FIG. 2, the backflow prevention device 1 closes the communication path 400 in order to prevent the molten metal 70 from flowing back into the melting unit 200 when the molten metal 70 in the injection unit 300 is injected to the mold 160.

Hereinafter, the configuration peculiar to the disclosure is described in detail.

As shown in FIGS. 3 to 9, the backflow prevention device 1 of the light metal injection device 120 of the disclosure includes a valve 20, a valve body drive device 30, a position sensor 40, and a valve body drive control device 50.

The valve 20 is configured by a valve body 21 and a valve seat 22.

The valve body 21 is made of a corrosion-resistant and heat-resistant steel. The valve body 21 has, for example, a rod shape. A rear end portion of the valve body 21 is connected to the valve body drive device 30. The valve body 21 is arranged to be easily replaceable as described later.

The valve seat 22 is made of a ceramic. The valve seat 22 is formed around an opening of the melting unit side end portion 401 of the communication path 400. In addition, the valve seat 22 may be arranged in the middle of the communication path 400. In addition, the valve seat 22 may also be formed around an opening of the injection unit side end portion 402 of the communication path 400.

When the valve seat 22 is formed in the melting unit 200, a valve body insertion hole 201 which inserts the valve body 21 from the outside to the inside of the melting unit 200 is formed in the melting unit 200. The valve body insertion hole 201 is formed in, for example, the lid member 212 which covers the upper opening portion of the bucket type melting furnace 211. In addition, the valve body insertion hole 201 is formed in, for example, the melting cylinder 213. At this time, the valve body insertion hole 201 is formed in a manner that the front end surface of the valve body 21 faces the valve seat 22 when the valve body is inserted from the outside to the inside of the melting unit 200.

The valve body 21 is exposed to the outside of the melting unit 200 from the body portion to the rear end portion. The rear end portion of the valve body 21 is connected to the valve body drive device 30. The valve body 21 is moved forward and backward by the valve body drive device 30. The valve body 21 advances and is seated on the valve seat 22 to close the communication path 400. The seated valve body 21 retracts from the valve seat 22 by a predetermined distance to open the communication path 400. A predetermined distance G may be 10 mm to 30 mm for example, and may be 20 mm. At this time, the space between the valve body insertion hole 201 and the valve body 21 may be sealed by a sealing member.

In addition, the valve body 21 may have an extension member 23 connected to the rear end portion thereof, and be connected to the valve body drive device 30 via the extension member 23. The extension member 23 may be formed to be larger than an outer diameter of the valve body 21 and smaller than an inner diameter of the valve body insertion hole 201. At least a part of the extension member 23 may be arranged in the valve body insertion hole 201 when the valve body 21 moves forward and backward to open and close the communication path 400. If the gap between the extension member 23 and the valve body insertion hole 201 is small, air can be prevented from entering from the outside of the melting unit 200. At this time, the space between the valve body insertion hole 201 and the extension member 23 may be sealed by a sealing member.

In addition, when the valve body 21 is replaced, the gap between the valve body 21 and the valve body insertion hole 201 is larger than the gap between the valve body insertion hole 201 and the extension member 23, and thereby the valve body 21 to which the molten metal 70 or the solidified molten metal 70 is attached can be easily extracted from the valve body insertion hole 201. Moreover, instead of using the extension member 23, as shown in FIG. 1 and FIG. 2, the outer diameter of a rear portion of the valve body 21 may be formed to be larger than the outer diameter of a front portion of the valve body 21. At this time, the space between the valve body insertion hole 201 and the rear portion of the valve body 21 may be sealed by a sealing member.

The valve body drive device 30 moves the drive body 31 to which the valve body 21 is connected in the front-rear direction together with the valve body 21, for example. The valve body drive device 30 is, for example, a fluid type piston cylinder 30a. At this time, the drive body 31 is a piston 31a. The rear end portion of the valve body 21 is connected to a front end portion of a rod of the piston 31a.

The fluid is, for example, oil, air, or the like. A piston cylinder 30a is adopted, in which a movable distance of the piston 31a is larger than a moving distance when the drive body 31 moves forward and backward from an advance limit position to a retraction limit position described later. Moreover, the valve body drive device 30 may be an electric valve body drive device using a motor.

For example, the valve body drive device 30 includes a hydraulic piston cylinder 30a, a hydraulic pump (not shown), an oil tank (not shown), and a direction switching valve (not shown). The direction switching valve is, for example, a four-direction four-port three-position electromagnetic valve. Regarding the four-direction four-port three-position electromagnetic valve, a piston head side oil chamber of the piston cylinder 30a is connected to an A port, a piston rod side oil chamber is connected to a B port, the hydraulic pump is connected to a P port, and the oil tank is connected to a T port.

The four-direction four-port three-position electromagnetic valve switches among a first switching position where the A port and the P port are connected and the B port and the T port are connected, a second switching position where all ports are closed, and a third switching position where the B port and the P port are connected and the A port and the T port are connected.

The first switching position is a position to be switched when the valve body 21 is advanced until it comes into contact with the valve seat 22 and when the valve body 21 is pressed against the valve seat 22 at a predetermined pressure. The second switching position is switched when the state in which the valve body 21 presses the valve seat 22 at the predetermined pressure is held. The third switching position is switched when the valve body 21 is retracted with respect to the valve seat 22.

The valve body drive device 30 may have a configuration in which a plurality of valve body drive devices 30, 30 and a connection member 34 connecting drive bodies 31, 31 of the plurality of valve body drive devices 30, 30 to the valve body 21 are included, the valve body 21 is attached to a center of the connection member 34, and the plurality of drive bodies 31, 31 are attached around the center of the connection member 34. In other words, the configuration is as follows. The valve body drive device 30 includes, for example, a plurality of piston cylinders 30a, 30a, a main body fixing member 32, a cylinder attachment member 33, the connection member 34, and a plurality of fixing rods 35, 35. The plurality of piston cylinders 30a, 30a are driven in synchronization. The main body fixing member 32 is attached to the melting unit 200. In the main body fixing member 32, a through hole 32a is formed at a position that allows the valve body 21 to movably pass through and that is connected to the valve body insertion hole 201 of the melting unit 200. If the melting unit 200 is the bucket type melting furnace 211 covered by the lid member 212, the lid member 212 may be the main body fixing member 32. When the lid member 212 is the main body fixing member 32, the valve body insertion hole 201 formed in the lid member 212 becomes the through hole 32a formed in the main body fixing member 32. The rear end portions of the plurality of piston cylinders 30a, 30a are attached to the cylinder attachment member 33. The front end portions of the rods of the plurality of pistons 31a, 31a are respectively connected to the connection member 34, and the connection member 34 moves between the main body fixing member 32 and the cylinder attachment member 33. The plurality of fixing rods 35, 35 fix the cylinder attachment member 33 to the main body fixing member 32. The plurality of fixing rods 35, 35 may be respectively slidably inserted into the plurality of guide holes 34b, 34b formed in the connection member 34 and guide the movement of the connection member 34 in the front-rear direction. At this time, the drive body 31 is configured by the plurality of pistons 31a, 31a and the connection member 34. The valve body 21 or the extension member 23 to which the valve body 21 is attached is connected to the connection member 34 of the drive body 31. In addition, the extension member 23 may also be included in the drive body 31. In addition, a part of the valve body 21 which does not wear may also be included in the drive body 31.

Furthermore, in the connection member 34, a through hole 34a for passing the valve body 21 or the extension member 23 to which the valve body 21 is attached when the valve body 21 is replaced may be formed. A valve body attachment member 36 may be attached to the rear end portion of the valve body 21 or a rear end portion of the extension member 23. The valve body 21 or the extension member 23 to which the valve body 21 is attached passes through the through hole 34a of the connection member 34, and the valve body attachment member 36 is attached to the connection member 34 in a contact state, and thereby the valve body 21 or the extension member 23 to which the valve body 21 is attached is attached to the connection member 34. At this time, at least a part of the through hole 34a of the connection member 34 is blocked by the valve body attachment member 36 from the cylinder attachment member 33 side. Moreover, the valve body attachment member 36 and the extension member 23 may be integrally formed.

In the cylinder attachment member 33, a through hole 33a may be formed for passing the valve body 21 or the extension member 23 to which the valve body 21 is attached and passing the valve body attachment member 36 when the valve body 21 is replaced. At this time, the drive body 31 is configured by the pistons 31a, 31a, the connection member 34, and the valve body attachment member 36. Moreover, the extension member 23 may also be included in the drive body 31.

In the connection member 34, the front end portions of the rods of the plurality of pistons 31a, 31a are respectively attached around the through hole 34a. In the cylinder attachment member 33, the rear end portions of the plurality of piston cylinders 30a, 30a are respectively attached around the through hole 33a. For example, the plurality of piston cylinders 30a, 30a may be arranged line-symmetrically or point-symmetrically taking an axis extending along an axis center of the valve body 21 as a center.

The position sensor 40 outputs a signal indicating that the drive body 31 has reached at least a predetermined advance limit position. The position sensor 40 detects that the drive body 31 has reached at least the predetermined advance limit position and outputs a signal indicating that the drive body 31 has reached the predetermined position. For example, the position sensor 40 is a sensor which detects that a piston head or a piston rod configuring the piston 31a has reached a predetermined position in a contact manner or a non-contact manner, and outputs a signal indicating that the piston 31a has reached the predetermined position.

For example, a contact position sensor includes a contact rod which is attached to the drive body 31 and moves forward and backward together with the drive body 31, and a contact switching element attached to a predetermined position outside the piston cylinder 30a. The contact rod that has moved to the predetermined position comes into contact with the contact switching element, and thereby the contact position sensor detects that the drive body has reached the predetermined position.

For example, a non-contact position sensor includes a magnet incorporated in the piston head of the piston 31a, and a magnetic force sensor or a magnetic force switch attached to a predetermined position of an outer circumference of the piston cylinder 30a. The magnetic force sensor or the magnetic force switch reacts to the magnet that has moved to the predetermined position, and thereby the non-contact position sensor detects that the drive body 31 has reached the predetermined position.

The position sensor 40 may include a front side position sensor which outputs a signal indicating that the drive body 31 has reached the predetermined advance limit position when the drive body 31 has reached the predetermined advance limit position. In addition, in addition to the front side position sensor, the position sensor 40 may also include a rear side position sensor which outputs a signal indicating that the drive body 31 has reached the predetermined retraction limit position when the drive body 31 has reached the predetermined retraction limit position.

In addition, the position sensor 40 may adopt a position sensor which sequentially detects position information of the drive body 31 and sequentially outputs a signal indicating the position information. At this time, in the valve body drive control device 50 described later, the predetermined advance limit position of the drive body 31 and the predetermined retraction limit position of the drive body 31 are set in advance, and the valve body drive control device 50 detects that the drive body 31 has reached the predetermined advance limit position or the predetermined retraction limit position from the position information output by the position sensor 40.

For example, the position sensor 40 is configured by a rotary encoder (not shown), a rack 43a which is attached to the rod of the piston 31a and moves forward and backward with respect to the rotary encoder together with the rod of the piston 31a, and a pinion 43b which engages with the teeth of the rack and is attached to a rotation shaft of the rotary encoder.

The valve body drive control device 50 is connected to the valve body drive device 30 and the position sensor 40, and controls the valve body drive device 30 based on the signal output from the position sensor 40. The valve body drive control device 50 includes a storage device 51. The storage device 51 records a program of the backflow prevention device of the disclosure executed by the valve body drive control device to be readable. In addition, the storage device 51 records various set values required when the valve body drive control device 50 controls the valve body drive device 30 to be readable. In addition, the storage device 51 may record detection values output from various sensors connected to the valve body drive control device 50 if necessary.

In addition, the valve body drive control device 50 is connected to the main control device 130. The valve body drive control device 50 controls the valve body drive device 30 based on the signal output from the main control device 130. The valve body drive control device 50 controls the valve body drive device 30 in accordance with the operation of the light metal injection device 120, to open the communication path 400 when the molten metal 70 in the melting unit 200 is supplied into the injection unit 300, and close the communication path 400 in order to prevent the molten metal 70 from flowing back into the melting unit 200 when the molten metal 70 in the injection unit 300 is injected to the mold 160. Moreover, the valve body drive control device 50 may be included in the main control device 130.

The backflow prevention device 1 of the light metal injection device 120 of the disclosure may include a pressure sensor 60 which detects a pressure at which the seated valve body 21 presses the valve seat 22 and outputs a signal indicating the pressure. At this time, the valve body drive control device 50 has the pressure sensor 60 connected thereto and controls the valve body drive device 30 based on the signal of the pressure sensor 60. For example, the valve body drive control device 50 controls the valve body drive device 30 so as to maintain a predetermined pressure when the signal of the pressure sensor 60 indicates the predetermined pressure. The predetermined pressure is a pressure at which the valve body 21 made of a corrosion-resistant and heat-resistant steel is elastically deformed when the valve body 21 is seated on the valve seat 22, and the valve body 21 and the valve seat 22 comes into surface-contact with each other to close the communication path 400. In addition, the predetermined pressure is a pressure that opposes the pressure of the molten metal 70 which is going to flow back through the communication path 400. The pressure sensor 60 may be a load cell attached at a location where the pressure applied to the valve body 21 can be detected, for example, between the valve body 21 and the valve body attachment member 36, between the valve body 21 and the extension member 23, or between the extension member 23 and the valve body attachment member 36. In addition, the pressure sensor 60 may be, for example, a pressure sensor which detects the pressure in the piston head side oil chamber of the piston cylinder 30a.

As an outline diagram of an operation flow shown in FIG. 10 and schematic views showing a first state P1 in FIG. 11 to an eighth state P8 in FIG. 18, the backflow prevention device 1 of the light metal injection device 120 of the disclosure and the backflow prevention method of the light metal injection device 120 of the disclosure can easily detect the replacement time of the valve body 21 which is made of a corrosion-resistant and heat-resistant steel and gradually wears out due to melting damage, plastic deformation or the like, and further replace the valve body 21 in a timely and easy manner to easily maintain and manage the required sealing performance. Moreover, the wear-and-tear of the valve body 21 means that the length of the valve body 21 is shortened. The length of the valve body 21 is the length of the valve body 21 with respect to the direction in which the valve body 21 moves forward and backward.

For example, the backflow prevention device 1 includes at least one first position sensor 41, at least one second position sensor 42, at least one third position sensor 43, and at least one pressure sensor 60. The first position sensor 41 is the front side position sensor described above. The second position sensor 42 is the rear side position sensor described above. The third position sensor 43 is the position sensor which sequentially detects the position information of the drive body 31 as described above, and here, the third position sensor 43 is used when the drive body 31 is retracted so that the valve body 21 retracts from the valve seat 22 by the predetermined distance G with reference to the position of the drive body 31 when the valve body 21 is seated each time. In addition, here, the valve body 21 is seated in a state of being pressed against the valve seat 22 at the predetermined pressure after coming into contact with the valve seat 22.

As shown in FIGS. 11 to 18, the predetermined advance limit position of the drive body 31 is decided based on an allowable maximum wear-and-tear amount Hef of the valve body 21 (hereinafter referred to as the maximum wear-and-tear amount Hef). Here, the wear-and-tear amounts He and Hef of the valve body 21 are lengths obtained by subtracting lengths L and Lf of the valve body 21 after use from a length Ls of the new valve body 21 before use. The lengths L, Ls, and Lf of the valve body 21 are lengths in the front-rear direction in which the valve body 21 moves. The length L of the valve body 21 wears out and is gradually shortened while the communication path 400 is repeatedly opened and closed. The position of the drive body 31 when the valve body 21 is seated on the valve seat 22 gradually shifts forward while the communication path 400 is repeatedly opened and closed. For example, the predetermined advance limit position of the drive body 31 is the position of the drive body 31 when the drive body 31 is advanced and the valve body 21 is seated on the valve seat 22, the valve body 21 having the length Lf obtained by subtracting the maximum wear-and-tear amount Hef from the length Ls of the new valve body 21 before use. For example, when the outer diameter of the valve body 21 is 25 mm or more and 35 mm or less, the outer diameter of the valve seat 22 is 30 mm or more and 40 mm or less, and the inner diameter of the communication path 400 is 10 mm or more and 15 mm or less, the allowable wear-and-tear amount of the valve body 21 may be 30 mm or less. For example, when the outer diameter of the valve body 21 is 28 mm or more and 33 mm or less, the outer diameter of the valve seat 22 is 32 mm or more and 38 mm or less, and the inner diameter of the communication path 400 is 11 mm or more and 14 mm or less, the allowable wear-and-tear amount of the valve body 21 may be 20 mm or less. Further, for example, when the outer diameter of the valve body 21 is 30 mm, the outer diameter of the valve seat 22 is 34 mm, and the inner diameter of the communication path 400 is 12 mm, the allowable wear-and-tear amount of the valve body 21 may be 17 mm or less.

For example, the predetermined retraction limit position of the drive body 31 is the position where the valve body drive device 30 can retract the drive body 31 most.

The valve body drive control device 50 is connected to the first position sensor 41, the second position sensor 42, the third position sensor 43, and the pressure sensor 60, and controls the valve body drive device 30 based on the signals of these sensors 41, 42, 43, and 60. In the storage device 51 of the valve body drive control device 50, for example, the predetermined distance G by which the seated valve body 21 retracts from the valve seat 22 when the communication path 400 is opened and the predetermined pressure value at which the valve body 21 presses the valve seat 22 when the valve body 21 is seated are recorded as the preset values.

First, in preparation, the backflow prevention device 1 operates as follows.

As shown in FIG. 5, the drive body 31 is retracted to the retraction limit position before the valve body 21 is attached or the valve body 21 is replaced (S1). The valve body drive control device 50 controls the valve body drive device 30 to retract the drive body 31 until the second position sensor 42 detects that the drive body 31 has retracted to the retraction limit position.

As shown in FIG. 5, the valve body 21 is attached to the drive body 31 which has retracted to the retraction limit position (S2). The valve body 21 before replacement which was attached to the drive body 31 or the valve body 21 which is newly attached to the drive body 31 is arranged at a retreat position above the liquid surface of the molten metal 70 in the melting unit 200, and is not immersed in the molten metal 70 inside the melting unit 200.

As shown in FIG. 6, after the drive body 31 to which the valve body 21 is attached is advanced to bring the valve body 21 into contact with the valve seat 22, the valve body 21 is further pressed against the valve seat 22 at the predetermined pressure (S3). The valve body 21 is seated on the valve seat 22 at the predetermined pressure to close the communication path 400 (S4). The valve body drive control device 50 controls the valve body drive device 30 to advance the drive body 31 until the pressure sensor detects that the valve body 21 is seated on the valve seat 22 at the predetermined pressure.

As shown in FIG. 7, the drive body 31 to which the valve body 21 is attached is retracted by the predetermined distance G (S5). The valve body 21 is retracted from the valve seat 22 by the predetermined distance G to open the communication path 400 (S6). The valve body drive control device 50 controls the valve body drive device 30 to retract the drive body 31 by the predetermined distance G based on the position information of the third position sensor 43.

Next, the backflow prevention device 1 operates as follows in accordance with the operation of the light metal injection device 120.

Repeating is made on: closing the communication path to prevent the molten metal from flowing back into the melting unit when the molten metal in the injection unit is injected to the mold (S7 to S9) as shown in FIG. 6, and opening the communication path when the molten metal in the melting unit is supplied into the injection unit (S10 and S6) as shown in FIG. 7. Moreover, while the communication path is opened, the valve body is separated from the valve seat by the predetermined distance. In addition, while the communication path is closed, the valve body presses the valve seat at the predetermined pressure.

For example, the main control device 130 outputs, to the valve body drive control device 50, a signal indicating that the metering step is completed and a signal indicating that the injection step is completed.

For example, after the metering step is completed, the valve body drive control device 50 controls the valve body drive device 30 to advance the drive body 31 until the pressure sensor 60 detects that the valve body 21 is seated on the valve seat 22 at the predetermined pressure. Furthermore, the valve body drive control device 50 subsequently controls, based on the pressure value detected by the pressure sensor 60, the valve body drive device 30 so as to maintain the state in which the valve body 21 is seated on the valve seat 22 at the predetermined pressure. The step of closing the communication path 400 is completed.

For example, after the injection step is completed, the valve body drive control device 50 controls the valve body drive device 30 to retract the drive body 31 by the predetermined distance G based on the position information of the third position sensor 43, and retracts the valve body 21 from the valve seat 22 by the predetermined distance G. The step of opening the communication path 400 is completed.

The valve body drive control device 50 outputs, to the main control device 130, a signal indicating that the step of opening the communication path 400 is completed and a signal indicating that the step of closing the communication path 400 is completed. The main control device 130 starts the injection step after the step of closing the communication path 400 is completed. The main control device 130 starts the metering step after the step of opening the communication path 400 is completed.

As shown in FIG. 8, the valve body 21 gradually wears out and is shortened while repeatedly opening and closing the communication path 400. If it is detected that the drive body 31 has reached the predetermined advance limit position before the valve body 21 comes into contact with the valve seat 22 or before the valve body 21 presses the valve seat 22 at the predetermined pressure (S8), the light metal injection device 120 and the light metal injection molding machine 100 are stopped (S11). Furthermore, as shown in FIG. 10, the valve body 21 is retracted to the retreat position (S12). In addition, for example, an alarm prompting the replacement of the valve body 21 may be displayed on the display device 150 of the light metal injection molding machine 100 (S13). Moreover, the retreat position of the valve body 21 is, for example, the position of the valve body 21 when the drive body 31 is retracted to the retraction limit position. In addition, the valve body 21 which has retracted to the retreat position may be arranged above the liquid surface of the molten metal 70 in the melting unit 200 so as not to be immersed in the molten metal 70.

For example, while the valve body drive control device 50 controls the valve body drive device 30 to advance the drive body 31 until the pressure sensor 60 detects that the valve body 21 is seated on the valve seat 22 at the predetermined pressure after the metering step is completed, if the first position sensor 41 detects that the drive body 31 has reached the advance limit position, the valve body drive control device 50 outputs a signal notifying the replacement of the valve body 21 to the main control device 130, and controls the valve body drive device 30 to retract the drive body 31 until the second position sensor 42 detects that the drive body 31 has retracted to the retraction limit position.

The main control device 130 receives the signal notifying the replacement of the valve body 21 and stops the light metal injection molding machine 100 and the light metal injection device 120. At this time, some devices such as various heaters, the mold clamping device 110, the material supply device 220, and the like can also be stopped if necessary. In addition, the main control device 130 receives the signal notifying the replacement of the valve body 21, and controls the display device 150 of the light metal injection molding machine 100 so as to display the notification of the replacement of the valve body 21. In addition, the main control device 130 may receive the signal notifying the replacement of the valve body 21 and control an alarm lamp (not shown) so as to light a lamp indicating the alarm.

In addition, the valve body drive control device 50 may calculate the wear-and-tear amount He of the valve body 21 indicated by a distance or the distance having a correlation with the wear-and-tear amount He of the valve body 21 based on the position information of the third position sensor every time or once every multiple times when the communication path 400 is opened and closed, store the wear-and-tear amount He or distance in the storage device 51 for time series, for each molding cycle or for each shot, and further display the wear-and-tear amount He or distance on the display device 150 of the light metal injection molding machine 100 or the like by a numerical value or a graph for time series, for each molding cycle or for each shot. Thereby, the replacement time of the valve body 21 can be predicted.

The wear-and-tear amount He of the valve body 21 indicated by the distance can be indicated by, for example, a distance between the position of the drive body 31 when the valve body 21 is first seated on the valve seat 22 after the valve body 21 is attached to the drive body 31 and the position of the drive body 31 when the valve body 21 is seated on the valve seat 22 thereafter.

A distance C1 having a correlation with the wear-and-tear amount He (hereinafter referred to as the distance C1) can be indicated by, for example, a distance between the predetermined advance limit position of the drive body 31 and the position of the drive body 31 when the valve body 21 is seated on the valve seat 22. In addition, a distance C2 having a correlation with the wear-and-tear amount He (hereinafter referred to as the distance C2) can be indicated by, for example, a distance between the predetermined advance limit position of the drive body 31 and the position of the drive body 31 when the seated valve body 21 is retracted from the valve seat 22 by the predetermined distance G. The distances C1 and C2 have a correlation with the wear-and-tear amount He of the valve body 21, and decrease as the wear-and-tear amount He of the valve body 21 increases. Moreover, the distance C2 is a distance obtained by adding the predetermined distance G to the distance C1.

Furthermore, the description is given in detail with reference to FIGS. 11 to 18. FIGS. 11 to 18 are schematic views showing the operations of the backflow prevention device 1 of the disclosure. FIGS. 11 to 18 show the operations of the backflow prevention device 1 in time series in the order of the numbers of the drawings. FIGS. 11 to 18 show the first state P1 to the eighth state P8 of the backflow prevention device 1 in time series in the order of the numbers of the drawings. The position of the drive body 31 is the position of the piston head of the piston 31a, the position of the front end portion of the rod of the piston 31a, the position of the connection member 34, the position of the valve body attachment member 36, or the like. Moreover, the storage device 51 may store the predetermined advance limit position of the drive body 31 in the seventh state P7 described later in advance.

The first state P1 in FIG. 11 shows a state in which the new valve body 21 is attached after the drive body 31 is retracted to the retreat position. The retreat position at this time is the retraction limit position. The third position sensor 43 may set the state in which the drive body 31 has reached the retraction limit position as an origin point, and detect the position of the drive body 31 as the distance from the origin point.

The second state P2 in FIG. 12 shows a state in which the drive body 31 is advanced from the first state P1 and the new valve body 21 is first seated on the valve seat 22. The drive body 31 is advanced by a distance Hs from the retraction limit position. The position of the drive body 31 in the second state P2 may be stored in the storage device 51. The distance C1 is indicated by a distance between the position of the drive body 31 in the second state P2 and the predetermined advance limit position of the drive body 31 in the seventh state P7 described later.

The third state P3 in FIG. 13 shows a state in which the drive body 31 is retracted by the predetermined distance G from the second state P2. The distance C2 is indicated by a distance between the position of the drive body 31 in the third state P3 and the predetermined advance limit position of the drive body 31 in the seventh state P7 described later.

The fourth state P4 in FIG. 14 shows a state in which the communication path 400 is repeatedly opened and closed multiple times, and then the drive body 31 is advanced to seat the valve body 21 on the valve seat 22. The wear-and-tear amount He of the valve body 21 is indicated by a distance between the position of the drive body 31 in the second state P2 and the position of the drive body 31 in the fourth state P4. The distance C1 is indicated by a distance between the position of the drive body 31 in the fourth state P4 and the predetermined advance limit position of the drive body 31 in the seventh state P7 described later.

The fifth state P5 in FIG. 15 shows a state in which the drive body 31 is retracted by the predetermined distance G from the fourth state P4. The distance C2 is indicated by a distance between the position of the drive body 31 in the fifth state P5 and the predetermined advance limit position of the drive body 31 in the seventh state P7 described later.

The sixth state P6 in FIG. 16 shows a state in which the drive body 31 is retracted by the predetermined distance G from the state in which the valve body 21 is seated on the valve seat 22 after the communication path 400 is further repeatedly opened and closed multiple times (P6). The distance C2 is indicated by a distance between the position of the drive body 31 in the sixth state P6 and the predetermined advance limit position of the drive body 31 in the seventh state P7 described later.

The seventh state P7 in FIG. 17 shows a state in which the drive body 31 has reached the advance limit position in the middle of advancing the drive body 31 from the sixth state P6. The maximum wear-and-tear amount Hef is indicated by a distance between the position of the drive body 31 in the second state P2 and the position of the drive body 31 in the seventh state P7. Moreover, the distance C1 is zero.

The eighth state P8 in FIG. 18 shows a state in which the drive body 31 is retracted from the seventh state P7 to the retreat position. The retreat position at this time is the retraction limit position. The drive body 31 retracts by a distance Hf from the advance limit position to the retraction limit position.

The maximum wear-and-tear amount Hef can also be indicated by a distance obtained by subtracting, from the distance Hf by which the drive body 31 has retracted from the seventh state P7 to the eighth state P8, the distance Hs by which the drive body 31 has advanced from the first state P1 to the second state P2. In addition, the maximum wear-and-tear amount Hef can also be indicated by a distance obtained by subtracting, from the length Ls of the new valve body 21 before use as in the first state P1, the length Lf of the valve body 21 when the drive body 31 has reached the predetermined advance limit position in the middle of advancing while the communication path 400 is repeatedly opened and closed as in the seventh state P7 or the eighth state P8.

In order to suppress the wear-and-tear, for example, the valve body 21 may retract to the retreat position above the liquid surface of the molten metal 70 in the melting unit 200 when the working of the light metal injection device 120 is stopped so as not to be immersed in the molten metal 70. The retreat position of the valve body 21 is, for example, the position of the valve body 21 when the drive body 31 is retracted to the retraction limit position. The state in which the working of the light metal injection device 120 is stopped refers to, for example, a state where the light metal injection device 120 is started up and each part or a part of the light metal injection device 120 is heated to a predetermined temperature by the heater, a state where the working of the light metal injection device 120 is temporarily stopped while the heat of each part or a part of the light metal injection device 120 is retained by the heater, a state where all the heaters arranged in each part of the light metal injection device 120 are stopped, or other states.

For example, the main control device 130 outputs, to the valve body drive control device 50, a signal indicating that the working of the light metal injection device 120 is about to be stopped or a signal indicating that the working of the light metal injection device 120 has been stopped. The valve body drive control device 50 receives the signal indicating that the working of the light metal injection device 120 is about to be stopped or the signal indicating that the working of the light metal injection device 120 has been stopped, and controls the valve body drive device 30 to retract the drive body 31 until the second position sensor 42 detects that the drive body 31 has retracted to the retraction limit position.

Before the working of the light metal injection device 120 is stopped, for example, if the main control device 130 controls the material supply device 220 in advance to reduce the amount of the unmelted light metal material 170 supplied to the melting furnace 210, the height of the liquid surface of the molten metal 70 in the melting unit 200 when the working of the light metal injection device 120 is stopped can be lowered. If the height of the liquid surface of the molten metal 70 in the melting unit 200 is lowered, the retreat position of the valve body 21 can be lowered. At this time, when the valve body 21 is retracted to the retreat position, at least a part of the extension member 23 attached to the valve body 21 may be arranged in the valve body insertion hole 201 of the melting unit 200.

Moreover, in the configuration in which the valve body 21 is advanced from top to bottom to be seated on the valve seat 22, the valve body 21 can be easily replaced without previously discharging the molten metal 70 in the light metal injection device 120.

The backflow prevention device of a light metal injection device and the backflow prevention method of a light metal injection device of the disclosure can easily obtain the required sealing performance when the valve body is seated on the valve seat and sealed, and can replace the valve body in a timely manner to easily maintain and manage the required sealing performance.

The embodiment was chosen in order to explain the principles of the disclosure and its practical applications. Many modifications and variations are possible in light of the above teachings. It is intended that the scope of the disclosure be defined by the claims.

What is claimed is:

1. A backflow prevention device of a light metal injection device, which
    connects a melting unit which melts an unmelted light metal material into a molten metal and an injection unit which injects the molten metal into a mold by a communication path, wherein the molten metal is injected into the mold after being metered,
    opens the communication path when the molten metal in the melting unit is supplied to the injection unit, and
    closes the communication path when the molten metal in the injection unit is injected to the mold,
    the backflow prevention device of a light metal injection device comprising:
    a valve which has a valve body made of a corrosion-resistant and heat-resistant steel and a valve seat made of a ceramic, and in which the valve body advances and is seated on the valve seat to close the communication path, and the valve body retracts and is separated from the valve seat to open the communication path;
    a valve body drive device which moves a drive body to which the valve body is connected in a front-rear direction together with the valve body;
    a position sensor which detects that the drive body has reached at least a predetermined advance limit position and outputs a signal indicating that the drive body has reached the predetermined position; and
    a valve body drive control device which connects the valve body drive device and the position sensor respectively, and controls the valve body drive device based on the signal of the position sensor.

2. The backflow prevention device of a light metal injection device according to claim 1, wherein the valve seat is formed around an opening of a melting unit side end portion of the communication path, and the valve body moves forward and backward in the melting unit.

3. The backflow prevention device of a light metal injection device according to claim 2, wherein the valve body drive control device controls the valve body drive device so that the valve body retracts to a retreat position higher than a liquid surface of the molten metal in the melting unit, when the position sensor detects that the drive body has advanced to the advance limit position or when working of the light metal injection device is stopped.

4. The backflow prevention device of a light metal injection device according to claim 1, wherein the position sensor sequentially detects position information of the drive body moving forward and backward, and sequentially outputs a signal indicating the position information.

5. The backflow prevention device of a light metal injection device according to claim 4, wherein the valve body drive control device controls the valve body drive device so that the valve body seated on the valve seat is retracted from the valve seat by a predetermined retraction distance when the communication path is opened by separating the valve seat and the valve body.

6. The backflow prevention device of a light metal injection device according to claim 4, wherein the valve body drive control device calculates, based on the signal indicating the position information of the position sensor, a distance indicating a wear-and-tear amount of the length of the valve body in the front-rear direction or a distance having a correlation with the wear-and-tear amount.

7. The backflow prevention device of a light metal injection device according to claim 6, wherein the valve body drive control device calculates, as the distance indicating the wear-and-tear amount, a distance between a position of the drive body when the valve body is first seated on the valve seat after the valve body is attached to the drive body and a position of the drive body when the valve body is seated on the valve seat thereafter.

8. The backflow prevention device of a light metal injection device according to claim 6, wherein the valve body drive control device calculates, as the distance having a correlation with the wear-and-tear amount, a distance between the predetermined advance limit position of the drive body and a position of the drive body when the valve body is seated on the valve seat or when the valve body seated on the valve seat is retracted from the valve seat by a predetermined retraction distance.

9. The backflow prevention device of a light metal injection device according to claim 1, wherein the valve body drive control device controls the valve body drive device so that when the valve body is seated on the valve seat and the communication path is closed, the valve body comes into contact with the valve seat, and then the valve body presses the valve seat at a predetermined pressure that allows a front end of the valve body to deform elastically and allows the valve body and the valve seat to come into surface-contact with each other.

10. The backflow prevention device of a light metal injection device according to claim 9, comprising a pressure sensor which detects a pressure at which the valve body seated on the valve seat presses the valve seat and outputs a signal indicating the pressure, wherein the valve body drive control device has the pressure sensor connected thereto and controls the valve body drive device based on the signal of the pressure sensor.

11. The backflow prevention device of a light metal injection device according to claim 1, comprising a plurality of the valve body drive devices, and a connection member which connects drive bodies of the plurality of valve body drive devices to the valve body, and the valve body is attached to a center of the connection member, and the plurality of drive bodies are attached around the center.

12. The backflow prevention device of a light metal injection device according to claim 1, wherein the light metal material is aluminum.

* * * * *